US010513178B2

(12) United States Patent
Alfredson et al.

(10) Patent No.: US 10,513,178 B2
(45) Date of Patent: Dec. 24, 2019

(54) METHOD AND SYSTEM FOR CONTROLLING THE STABILITY AND YAW RESPONSE OF A VEHICLE BY LOCKING A DIFFERENTIAL AT ELEVATED SPEEDS

(71) Applicant: DSENSED TECHNOLOGY AB, Lerum (SE)

(72) Inventors: Jonas Alfredson, Lerum (SE); Mathias Lidberg, Gothenburg (SE)

(73) Assignee: DSENSED TECHNOLOGY AB, Lerum (SE)

( * ) Notice: Subject to any disclaimer, the term of this patent is extended or adjusted under 35 U.S.C. 154(b) by 155 days.

(21) Appl. No.: 15/318,892

(22) PCT Filed: Jun. 24, 2015

(86) PCT No.: PCT/SE2015/050733
§ 371 (c)(1),
(2) Date: Dec. 14, 2016

(87) PCT Pub. No.: WO2015/199606
PCT Pub. Date: Dec. 30, 2015

(65) Prior Publication Data
US 2018/0162223 A1 Jun. 14, 2018

(30) Foreign Application Priority Data

Jun. 24, 2014 (SE) ..................................... 1450781

(51) Int. Cl.
*B60K 28/16* (2006.01)
*B60W 10/16* (2012.01)
(Continued)

(52) U.S. Cl.
CPC ............. *B60K 23/04* (2013.01); *B60K 17/16* (2013.01); *B60K 17/20* (2013.01); *B60W 30/02* (2013.01);
(Continued)

(58) Field of Classification Search
CPC ..... B60K 28/16; B60W 10/16; B60Y 2300/84
See application file for complete search history.

(56) References Cited

U.S. PATENT DOCUMENTS 5,417,298 A    5/1995  Shibahata
2002/0070066 A1*  6/2002  Nakamura ............. B60K 23/04
                                                            180/249

(Continued)

FOREIGN PATENT DOCUMENTS

GB    2 066 919 A    7/1981
JP    62-178434 A    8/1987
(Continued)

OTHER PUBLICATIONS

European Search Opinion issued in Application No. 15811019.7, dated Oct. 17, 2018.
(Continued)

Primary Examiner — Tisha D Lewis
(74) Attorney, Agent, or Firm — Young & Thompson

(57) ABSTRACT

A method and system for controlling the stability and yaw response of a vehicle being equipped with a front axle (24), a rear axle (26), a controllable differential (22) and a control unit (50) arranged for locking and unlocking the differential (22), the method includes: selectively locking or unlocking the differential (22) depending on the operation of the vehicle; measuring at least the longitudinal vehicle speed (v); comparing the measured vehicle speed (v) with a predetermined first reference speed ($v_H$); and locking the differential (22) if the measured vehicle speed (v) exceeds the first reference speed ($v_H$).

11 Claims, 20 Drawing Sheets

(51) Int. Cl.
  *B60K 23/04* (2006.01)
  *B60K 17/16* (2006.01)
  *F16H 48/20* (2012.01)
  *B60W 30/02* (2012.01)

(52) U.S. Cl.
  CPC ........ *F16H 48/20* (2013.01); *B60K 2023/046* (2013.01); *B60W 10/16* (2013.01); *B60W 2520/10* (2013.01); *B60W 2540/10* (2013.01); *B60W 2540/12* (2013.01); *B60W 2540/18* (2013.01); *B60W 2710/125* (2013.01); *B60W 2720/406* (2013.01); *B60Y 2300/022* (2013.01); *B60Y 2300/84* (2013.01); *F16H 2048/205* (2013.01)

(56) References Cited

U.S. PATENT DOCUMENTS

| | | | |
|---|---|---|---|
| 2007/0184929 A1 | 8/2007 | Plybongkarn et al. | |
| 2008/0208428 A1* | 8/2008 | Thompson | B60K 23/04 701/82 |
| 2011/0022279 A1* | 1/2011 | Povirk | B60K 23/04 701/68 |
| 2014/0324290 A1* | 10/2014 | Dornhege | B60T 8/175 701/41 |
| 2016/0194001 A1* | 7/2016 | Kelly | B60K 28/165 701/41 |

FOREIGN PATENT DOCUMENTS

| | | |
|---|---|---|
| WO | 81/02049 A1 | 7/1981 |
| WO | 2006/041384 A1 | 4/2006 |

OTHER PUBLICATIONS

International Search Report, dated Oct. 7, 2015, from corresponding PCT Application.

* cited by examiner

METHOD AND SYSTEM FOR CONTROLLING THE STABILITY AND YAW RESPONSE OF A VEHICLE BY LOCKING A DIFFERENTIAL AT ELEVATED SPEEDS

TECHNICAL FIELD

The invention relates to a method for controlling the stability and yaw response of a vehicle being equipped with a front axle, a rear axle, a controllable differential and a control unit arranged for locking and unlocking said differential, said method comprising: selectively locking or unlocking said differential depending on the operation of said vehicle.

The invention also relates to a system for controlling the stability and yaw response of a vehicle being equipped with a front axle, a rear axle, a controllable differential and actuation means arranged for locking and unlocking said differential, and a control unit being configured for controlling said actuation means for selectively locking or unlocking said differential depending on the operation of said vehicle.

The invention can be applied in vehicles, such as cars, trucks, buses etc. Although the invention will be described with respect to an application in the form of a car, the invention is not restricted to this particular type of vehicle, but may be used in other vehicles.

BACKGROUND

In most vehicles there is a need for some kind of differential in the drive train to enable a speed difference between the drive wheels when driving in tight bends. By far the most common solution to this problem is the so called open differential. However, a well-known disadvantage of open differentials occurs when one of the driven wheels engages the road surface with a low coefficient of friction [mu] while the other has a higher [mu]. In such cases, the low traction effort developed at the low [mu] contact surface prevents significant torque from being developed at the other wheel. Since the torque between the two axle shafts of an open differential is always almost equal, little total traction effort can be developed to pull the vehicle from its position.

Because of this basic disadvantage, different kinds of locking differentials have been developed. One early variant that was developed to solve this disadvantage is the manually switchable locking differential which is either fully open or fully locked. This variant, in its locked mode, gives the best possible traction in split-[mu] conditions. However, the driver himself needs to make sure the differential is in its open mode before attempting to make a tight turn for example on dry tarmac to avoid extreme loads on the drive shafts etc. as well as avoiding a strong yaw resisting moment about the yaw axis of the vehicle trying to prevent the vehicle from turning. Locking differentials of this kind are normally fitted to off road- or utility vehicles to improve low speed traction on less than perfect roads. A fully locked differential can also lead to a certain degree of self-steering behaviour in severe split [mu] situations if the input torque is high. This problem can be diminished if the driver modulates the throttle properly or if a traction control system makes the torque demand reduction for him to get the best possible compromise between traction capability and self-steering behaviour, meaning that an acceptable degree of counter steering is needed by the driver.

Similar disadvantages of the open differential can also occur in situations with a perfectly balanced [mu]-value side to side. In dynamic driving events, like turning at speed, there will be a lateral load transfer which will cause the drive wheels on either side of the vehicle to get differentiated normal forces which in more severe cornering situations can render a lightly loaded drive wheel with very little traction capacity leading to a low total traction effort despite the heavier loaded drive wheel really being able to handle much more torque than it is being subjected to by the open differential, that always divides the torque equally between both drive wheels.

In the above mentioned situation the open differential would, by changing its internal rotation direction, allow the inside drive wheel to revolve at a higher rotational speed than the corner outer drive wheel even though the latter covers a greater road distance during cornering situations. This happens due to the fact that the differentiated normal forces alter the longitudinal stiffness of each individual tire which means that the slip rate of the corner inner wheel will be substantially higher than that of the outer wheel. If you in the same situation would lock the differential it wouldn't allow the inside drive wheel to over-speed the outer but would instead, in this situation, send more than half of the torque to the corner outer drive wheel. This phenomenon is described in greater detail in the patent document WO 2006/041384, in which the mentioned rotational direction changing event is called the "cross-over-point" and the Locking Differential described is referred to as being "direction sensitive". Hence, this kind of differential will herein be referred to as a "Direction Sensitive Locking Differential" (DSLD). In the case of the DSLD, two separate actuators are used to control the locking of the differential in each of the two potential differentiation directions. To fully lock the DSLD both actuators are excited simultaneously. There might also be a separate actuator to unlock the DSLD.

There have been many attempts to solve the above mentioned problem by designing different kinds of self-locking differentials or so called Limited Slip Differentials (LSD). These differentials can function according to different principles but probably the most common principle utilizes clutches to generate friction that can transfer torque between each output shaft by more or less locking the output shafts of the differential together. The simpler variants may have spring loaded clutch packs and the amount of spring preload, the number of active friction surfaces and the coefficient of friction will decide how much torque difference it will take for the differential to start differentiating. If this friction force is high, the traction capabilities will be good but the LSD will also induce quite a bit of extra under steer, especially when driving slowly (low lateral load transfer) in tighter corners. This means that the friction force will be a compromise that needs to be found depending on which is deemed more important.

There are more advanced clutch pack type LSD's, which typically contain actuator mechanisms including cam ramps with interchangeable angles for tuned clamping power of the clutch packs in response to the amount and direction of the input torque. These force transmitting ramps mean that the need for a static preload is far smaller and it can even be omitted completely in some cases which would mean that the LSD is practically an open differential for as long as there is no input torque. These more advanced LSD's are often used in motorsport applications and the general idea behind them is to be able to tune the amount of torque transfer during acceleration independently from the amount of torque transfer during deceleration and braking and thereby being able to tune the handling balance of the vehicle for different driving scenarios.

As previously mentioned there is lateral load transfer in response to cornering that transfers normal forces acting on the wheels and tires from the corner inner wheels to the outer wheels in the cornering situation, due to lateral acceleration. There is also longitudinal load transfer, which increases the normal force of the rear wheels at the expense of the normal force of the front wheels in response to longitudinal acceleration, or the other way around in longitudinal deceleration. This longitudinal load transfer thus invokes under steer in response to (positive longitudinal) acceleration and over steer in response to deceleration (or in other words negative longitudinal acceleration). When stating that it invokes over steer in response to deceleration it does not necessarily mean that it will become over steering, because that depends on the steady state handling balance designed in to the vehicle in the first place but rather that the balance will change in the direction towards over steer.

Racing cars, as an example, are generally tuned to have a nearly neutral steady state handling balance and they are often equipped with tuneable limited slip differentials. When they accelerate out of a corner, the corner outer drive wheel is generally much heavier loaded which means it can handle quite a bit more drive torque than the inner wheel can, which in many cases would mean that an open differential would start differentiating in the "wrong" direction which also would mean that it has passed the cross-over-point and that the differential generally for performance reasons should be locked in these situations and thereby allowing a stronger acceleration as well as giving a yaw supporting moment about the yaw axis of the vehicle and consequently counteracting the longitudinal acceleration-induced under steer. On the other hand, when a racing car is trail braking on its way into a corner the longitudinal load transfer towards the front axle will make the car potentially over steering and unstable, in this situation a locked differential would make the braking torques of the wheels of the driven axle differentiated in the way that the corner outer wheel would brake harder than the inner wheel, which would brake lighter or indeed in some cases could even have a positive drive torque if the total braking torque of the driven axle is low enough or if the yaw rate is high enough.

From this latter scenario we can see that the locked or more or less locked differential besides its traction enhancing influence also can help improve vehicle stability for example when decelerating by differentiating the longitudinal tire forces of the drive wheels and thereby giving a yaw resisting moment about the yaw axis of the vehicle.

From all this we can see that a properly tuned LSD to some extent can make the handling balance of the car more consistent by compensating for the unbalancing influences of the longitudinal accelerations when these are present and be more or less open when there is no input torque. Taking the previously mentioned effect of longitudinal accelerations and the accompanying load transfer, together with the fact that a more or less locked differential normally gives a yaw resisting effect which can turn into a yaw supporting effect if the input toque gets high enough we can draw the conclusion that the strongest yaw resisting moment can be achieved if the differentiated longitudinal forces are generated by the front axle and conversely, the strongest yaw supporting moment can be achieved if they are generated by the rear axle (presuming roughly equal tire sizes and a roughly balanced static weight distribution front to rear).

Apart from all of the above, there is of course also the other major influence on the handling balance stemming from the fact that the lateral capacity of a tire decreases as it is subjected to a (large enough) longitudinal drive force, which will invoke a drive force related, over steer tendency for rear wheel drive cars counteracting the load transfer based tendency for under steer during acceleration and conversely, which will invoke a drive force related under steer tendency for front wheel drive cars adding to the load transfer based one. If we again look at the above described situation with the racing car accelerating out of a corner. Presuming it is a rear wheel drive car, the latter of the above described influences may well take precedence over the load transfer based one making the car over steer, forcing the driver to properly modulate the throttle to avoid the car swerving out. However, it should be noted that if the driver manages this in a proper way the total amount of combined lateral and longitudinal forces that he can extract from the rear axle will be higher with the locked differential than with the open one, which actually is one of the main reasons race cars generally are equipped with LSDs. If on the other hand it is a front wheel drive car it will, because of these both added effects, ultimately end up under steering even though there also in this case will be advantageously differentiated longitudinal forces trying to counteract under steer. This latter reasoning shows that on principle the front wheel drive car almost cannot get too much of these differentiated longitudinal tire forces in acceleration situations. This fact together with the other above reasoning mean that one might argue that some form of ideal differential system will have the greatest benefit in front wheel drive cars. On the other hand it should be mentioned that differentiated longitudinal tire forces in a front axle can have its own problems in the form of torque steer effects meaning that torques and moments can transfer from the drive wheels to the steering wheel, which in itself can place special demands on the steering geometry etc.

Although we can get some performance- and some stability-benefits from the mentioned more advanced Limited Slip Differentials, all passive LSD variants are still to some extent a compromise between the ability to allow differentiation at the highest possible efficiency when that is appropriate but still have the ability to more or less fully lock any differentiation when that is the best for the performance and or stability of the vehicle.

For this reason the electronically controlled Limited Slip Differential (eLSD) has been developed. The eLSD generally has one multi plate clutch connected to an open differential and an actuator that, via an electronic control unit, can apply a controlled amount of clamping pressure to the clutch and thereby controlling the eLSD to be anything between fully open and fully locked.

Passenger cars, as a contrast to racing cars, are generally tuned to have a more under steering handling balance. The reasons for this are several but some of them are the facts that driving safety generally is higher on the priority list and performance is lower on the same list, passenger car drivers are also most often less experienced at driving at the handling limit which means that there is a need for a larger stability margin to help them cope with an eventual critical situation like a necessary evasive manoeuvre, especially at higher speeds when yaw damping is severely compromised and yaw over shoots are likely in response to sudden lane change manoeuvres etc. However, even if a vehicle is engineered to be quite severely under steering in steady state cornering situations it will generally still be possible to make it over steering and unstable in certain transient situations even though it will take more stability upsetting inputs to make it so, as compared to a vehicle with a more neutral handling balance. This fact together with the fact that a severely under steering vehicle might not always be considered the most fun to drive vehicle mean that vehicle engineers will have to come up with a compromise to the handling balance with regards to the partly conflicting characteristics of stability and driving pleasure.

In addition to the LSD- or eLSD-systems there are other systems that are even more effective at giving a more consistent handling balance irrespectively of the input torque. These systems are generally labelled "torque-vectoring" systems and can force the drive wheels to differentiate and thereby they have the ability to send more than half of the input torque to the one driving wheel with the highest rotational speed which is not possible with any kind of LSD which can only send more than half of the torque to the wheel with the lowest rotational speed or, if both wheels have the same rotational speed, to the wheel with the strongest resistance. However, these torque-vectoring systems are significantly more complex and therefore also more expensive. When it comes to the above mentioned compromise in handling balance there is also the possibility to use various kinds of stability control systems.

Stability control systems may be applied to help drivers prevent a vehicle from losing control in critical situations. Most vehicle stability control systems in the market are brake-based. Typically these brake-based stability control systems use a reference model to calculate the appropriate yaw rate, based on the longitudinal speed of the vehicle, the under steer gradient of the vehicle and the steering input of the driver. This reference yaw rate is continuously compared to the actual yaw rate of the vehicle in a closed loop manner (i.e. feed-back control) and if the two differ more than a certain amount, the so called dead band, the electronic control system can apply braking torque to one or more wheels to bring the vehicle back to the intended direction and specifically when it comes to over steer correction the normal way to decrease the yaw rate is to brake the corner outer front wheel. The mentioned dead band is needed to avoid too frequent an intervening from the system which would lead to an unnecessarily high wear rate of the brake system components as well as potentially being perceived as disturbing or intrusive by the driver since brake based stability control systems generally can be felt and heard when active and some drivers may think of this as being deprived of the control of the vehicle. It is generally known to the automotive industry that similar yaw resisting moments as in brake-based over steer correction can be achieved by controllable differentials like for example the eLSD.

Without any kind of stability control system (and an open differential), the stability of a vehicle is solely dependent on the lateral capacities of the tires whereas stability control systems, as already explained, tend to utilise differentiated longitudinal tire forces to influence the yaw rate of the vehicle. As also already explained the brake-based systems does this by braking individual wheels which except altering the yaw rate also lead to a speed decrease. Differential-based stability control on the other hand redistributes the already existing tire longitudinal forces of the driven wheels in response to the yaw rate of the vehicle which means, first of all, that it does not give a net speed decrease as the brake-based systems do and also that it works according to a "reactive" principle which means that the amount of yaw resisting moment about the yaw axis of the vehicle is dependent on the yaw rate itself. The former means that there is no real need for a dead band and the latter means that the amount of yaw resisting moment to quite a large extent is self-regulating which means that the control effort of the differential-based systems is lower than for the brake-based systems, that need to modulate the total rotational speed of a wheel via the powerful means of a wheel brake, instead of just modulating the relative rotational speed of both drive wheels of an axle via an actuator located within the drive-train between the wheels. Although the brake-based systems in many cases are able to ultimately generate a stronger yaw resisting moment there is a greater risk of for example over actuation if the [mu]-value estimation is incorrect.

Apart from the mentioned lower control demand of the differential-based systems there are two other theoretical benefits of really redistributing the present longitudinal forces instead of adding a brake force. The most obvious benefit is that there is no net speed decrease and hence no longitudinal load transfer that actually in itself gives a slight stability disturbing effect by decreasing the lateral capacity of the rear axle. The other benefit is the fact that redistributing the existing longitudinal tire forces means that there, as compared to braking the corner outer wheel, generally is less deterioration of the overall lateral capacity of the axle in which the intervention is made, for an equal amount of yaw resisting moment. Although it is possible to get a yaw resisting moment from a controlled differential in either axle it is also for the differential-based systems, despite of the above mentioned general benefits, still slightly more effective to make the intervention in the front axle. The main reasons for this are of course the facts that the front axle, in a potential over steer situation, is the axle with the highest lateral capacity margin and also that the small deterioration of lateral capacity resulting from the intervention in this case affects the front axle which in itself leads towards under steer.

When looking at how these two different approaches can be used to solve the same potential stability problems it is also quite obvious that there is a possibility to get positive synergy effects by using both principles in a way that the differential-based interventions are prioritized and the brake-based interventions kicks in only if and when the former proves not to be sufficient. The above mentioned benefits of redistributing the tire forces (instead of braking individual wheels) mean, irrespective of if the controllable differential is located in the front-axle, in the rear-axle or in both, that it can be used more often and that it generally will not be perceivable by the driver, all of which can help contributing to enhance both the performance of the vehicle as well as the driving experience. However, using controllable differential-based systems (like the eLSD) to improve vehicle stability means increased costs both regarding differential hard ware components and its required control system.

Consequently, in the field of vehicles, there is a need for improved methods and systems which are configured for increasing the stability of a road vehicle and also for adapting and controlling the yaw response, especially in the event of the driver applying large and sudden steering input during medium to high speed driving. There is also a need for this to be accomplished using low cost components and simple control.

SUMMARY OF THE INVENTION

Consequently, an object of the present invention is to provide a method and a system which solves the problems associated with prior solutions and by means of which vehicle medium to high speed stability can be increased and the yaw response of the vehicle can be altered during transient steering manoeuvres, using at least one controllable differential.

According to a first aspect of the invention, the above-mentioned object is achieved by a method for controlling the stability and yaw response of a vehicle being equipped with a front axle, a rear axle, a controllable differential and a control unit arranged for locking and unlocking said differential, said method comprising selectively locking or unlocking said differential depending on the operation of said vehicle. According to the invention, the method further comprises measuring at least the longitudinal vehicle speed, comparing the measured vehicle speed with a predetermined first reference speed, and locking said differential if said measured vehicle speed exceeds said first reference speed.

An advantage of the present invention is that it provides a way of improving the stability as well as altering the yaw response of a vehicle through the use of a differential, which is locked and unlocked when specified conditions are fulfilled. A further advantage of the present invention is that it accomplishes the above using low cost components and simple control.

According to an embodiment, the first reference speed is chosen to a value within the interval 80-110 km/h.

According to an embodiment, it further comprises, in the event that the measured vehicle speed does not exceed said first reference speed: comparing the measured vehicle speed with a predetermined second reference speed; measuring the front wheel steer angle rate of the vehicle; comparing the front wheel steer angle rate with a predetermined reference value of the front wheel steer angle rate value. Furthermore, the differential is locked if the measured vehicle speed exceeds said second reference speed and the measured front wheel steer angle rate exceeds said predetermined reference value of the front wheel steer angle rate.

According to an embodiment, the second reference speed is suitably within the interval 60-80 km/h, also the reference value of the front wheel steer angle rate is set to a value within the interval 20-50 deg/s.

The above-mentioned object is also achieved by a system for controlling the stability and yaw response of a vehicle being equipped with a front axle, a rear axle, a controllable differential and actuation means arranged for locking and unlocking said differential, and a control unit being configured for controlling said actuation means for selectively locking or unlocking said differential depending on the operation of said vehicle. Furthermore, the control unit is configured for measuring at least the longitudinal vehicle speed, comparing the measured vehicle speed with a predetermined first reference speed and locking said differential if said measured vehicle speed exceeds said first reference speed.

It seems that the open differential has become so much of a norm in road vehicles that it is virtually unquestioned as the default solution in almost all driving situations and therefore, the normal way to use for example the eLSD to increase the medium to high speed stability is to, similarly to the brake-based systems, use a reference model and potentially lock any further differentiation once an over steer tendency has been detected, which means using feed-back control. This is most probably partly due to the fact that practically all vehicles are tuned to be under steering and no one therefore seems to want to risk the differential to increase the under steer characteristic even further in any situation when not really needed.

The present invention on the other hand is based on the insight that a locked differential actually gives a more consistent handling balance for as long as the cornering radiuses are big enough to avoid too big a yaw resisting moment about the yaw axis of the vehicle to develop. This insight is closely related to the fact that the minimum radius that the vehicle can follow is proportional to its longitudinal speed squared, presuming that the vehicle can achieve the same amount of lateral acceleration irrespective of its longitudinal speed. It is also based on the insight that when it comes to manoeuvrability at higher speeds the limiting factor is more about the ability to generate a high lateral acceleration rather than the ability to allow for a high yaw rate.

Further advantages and advantageous features of the invention are disclosed in the following description and in the appended claims.

BRIEF DESCRIPTION OF THE DRAWINGS

With reference to the appended drawings, below follows a more detailed description of embodiments of the invention cited as examples.

DETAILED DESCRIPTION OF EXAMPLE EMBODIMENTS OF THE INVENTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
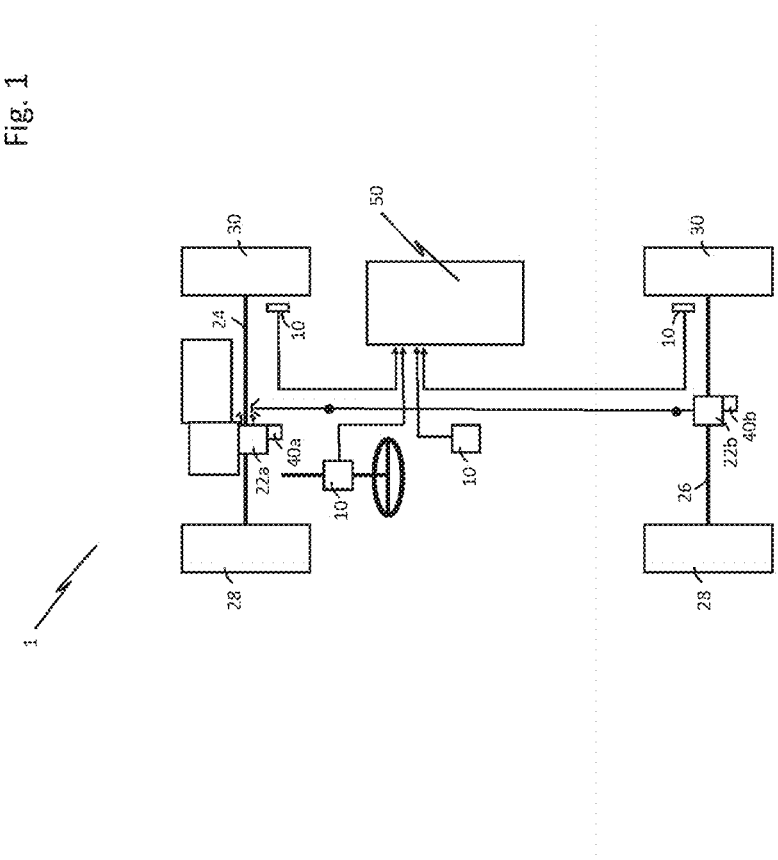
FIG. 1 is a schematic view of an exemplary vehicle driveline configuration including an electronically controllable locking differential in which the invention can be implemented.

With initial reference to FIG. 1, there is shown a simplified schematic view of a system in which the invention can be implemented. In particular, FIG. 1 shows a simplified schematic view of an exemplary vehicle 1 with a driveline configuration including an electronically controllable locking differential in which the invention can be implemented.

Referring to FIG. 1, a proposed driveline configuration 20 is shown, which is not intended to be limiting. Driveline 20 includes an electronically controlled differential 22a, 22b installed in at least one of a front axle 24 and a rear axle 26. In the description to follow, there is also reference to a "differential 22" to indicate that it may be constituted by a front differential 22a or a rear differential 22b, or a combined function including both a front and rear differential 22a, 22b. The controllable differential 22 may be used to transfer torque between left and right wheels 28, 30, (arranged in the front and rear axles 24, 26, respectively).

As shown in FIG. 1, there is also provided a number of sensors, schematically referred to by means reference numeral 10, which can be arranged for detecting the wheel speed (of each wheel), the steering wheel angle, the yaw rate of the vehicle and other parameters associated with the operating condition of the vehicle. Further operating conditions of the vehicle which may be detected is the longitudinal vehicle speed, actuation of a brake pedal, actuation of an accelerator pedal and actuation of a clutch pedal etc.

Referring to FIG. 1, a control unit 50 is also arranged in the vehicle 1. The control unit 50 is configured for executing a method of improving vehicle stability as well as altering the yaw response using torque transfer. To this end, the vehicle sensors 10 are connected to the control unit 50. Also, the control unit 50 is also connected to an actuator 40a, 40b for the front and rear differential, respectively. These actuators 40a, 40b (also referred to as "actuator 40" below) are arranged for selectively locking or unlocking the differential 22. According to the invention, such locking or unlocking operation is controlled depending on certain operational parameters as will be described below.

The control unit 50 can either be a dedicated, separate control unit or be formed as an integral part of another electronic control unit (ECU) of the vehicle 1, for example a unit for controlling the brakes of the vehicles in order to stabilize the vehicle, i.e. a so-called electronic stability controller (ESC).

According to the embodiment, the control unit 50 is configured for controlling the differential 22 in order to improve vehicle stability as well as altering the yaw response using torque transfer. This will now be described with reference to FIG. 2, which is a flow chart explaining various method steps according to the embodiment.

A process according to the embodiment is initiated at step 150, in which the control unit 50 determines the longitudinal vehicle speed of the vehicle 1 and compares it with a predetermined first reference speed. If the measured value of the vehicle speed exceeds the first reference speed, the control unit 50 compares (at step 152) the vehicle speed with a further reference speed, which is higher than the first reference speed (in step 150). If the vehicle speed exceeds the higher reference speed $v_H$, the control unit 50 will pre-emptively lock the differential 22, i.e. the actuator 40 of the differential 22 will be actuated for locking said differential 22. The effect, consequences and advantages of such locking will be described in greater detail below.

According to the embodiment, the higher reference speed $v_H$ is chosen within the interval 80-110 km/h, and is preferably approximately 90 km/h. Also, the lower reference speed $v_L$ is chosen within the interval 60-80 km/h, and is preferably approximately 70 km/h.

In the event that the measured vehicle speed v does not exceed the higher reference speed ($v_H$) but still exceeds the lower reference speed ($v_L$), the control unit 50 will check (in step 154) whether the front wheel steer angle rate (dδ/dt) of the vehicle is higher than a predetermined reference value (d$δ_1$). The front wheel steer angle magnitude of the vehicle is also measured and compared with a predetermined reference value ($δ_1$) of the front wheel steer angle value, and the differential 22 is locked if the measured vehicle speed exceeds the lower reference speed ($v_L$) and also either one of the following conditions:

i) the measured front wheel steer angle (δ) exceeds said predetermined reference value ($δ_1$) of the front wheel steer angle, or ii) the measured front wheel steer angle rate (dδ/dt) exceeds said predetermined reference value (d$δ_1$) of the front wheel steer angle rate, or iii) the measured front wheel steer angle (δ) exceeds said predetermined reference value ($δ_1$) of the front wheel steer angle and the measured front wheel steer angle rate (dδ/dt) exceeds said predetermined reference value (d$δ_1$) of the front wheel steer angle rate.

if not, the differential 22 will remain unlocked and the process will return to step 150.

Figure 2:
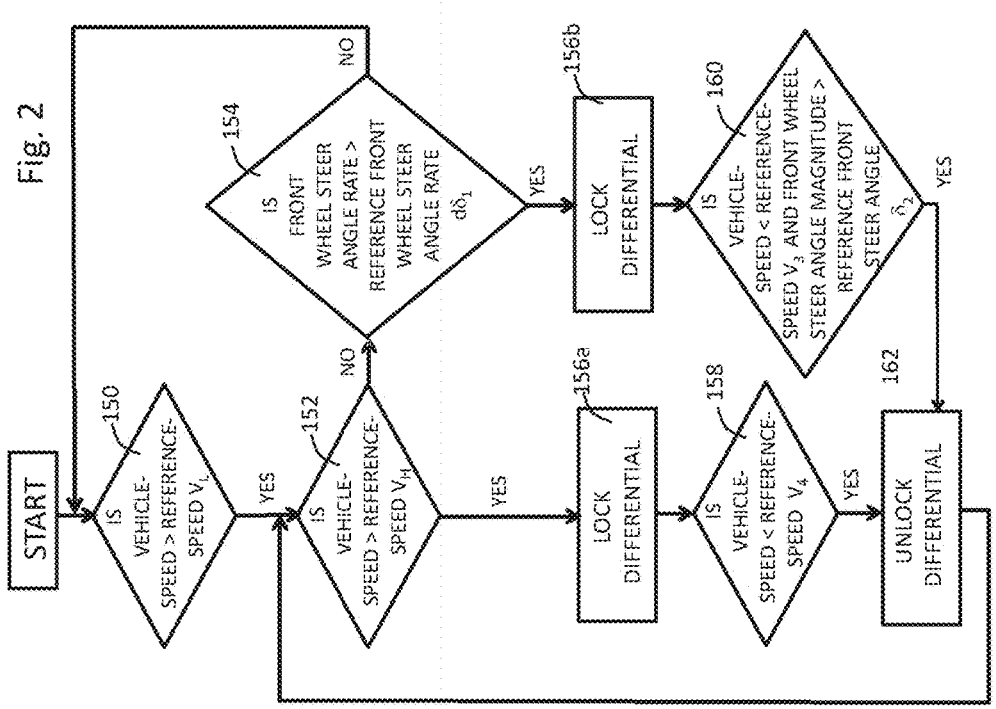
FIG. 2 is a logic flow-chart of an algorithm for controlling the state of the electronically controllable locking differential according to an embodiment of the present invention.

Step 156a,b in FIG. 2 corresponds to a condition in which the differential 22 is locked by means of the actuator 40.

From step 156a the process proceeds to step 158 in which the control unit 50 checks whether the vehicle speed v drops below a further reference value $v_4$ which corresponds to a value at which it is suitable to remove said pre-emptive locking of the differential 22. For this reason, the fourth reference speed $v_4$ is preferably in the region of 5-10 km/h lower than $v_H$.

From step 156b the process proceeds to step 160 in which the control unit 50 firstly checks whether the vehicle speed v is below a further reference value $v_3$ and secondly, checks whether the front wheel steer angle magnitude is higher than a further predetermined reference value ($\delta_2$), which corresponds to a vehicle state at which it is suitable to unlock the differential 22. Suitably, the reference value $v_3$ is chosen so that the properties of a locked differential 22 does not negatively affect the manoeuvrability of the vehicle at a low to medium range vehicle speed in situations when the extra vehicle stability is not needed. For this reason, the third reference speed $v_3$ is chosen within the interval 55-80 km/h.

The present invention is based on the insight that a locked differential actually gives a more consistent handling balance for as long as the cornering radiuses are big enough to avoid too big a yaw resisting moment about the yaw axis of the vehicle to develop. This insight is closely related to the fact that the minimum corner radius that the vehicle can follow is proportional to its longitudinal speed squared, presuming that the vehicle can achieve the same amount of lateral acceleration irrespective of its longitudinal speed. The present invention is also based on the insight that when it comes to manoeuvrability at higher speeds the limiting factor is more about the ability to generate a high lateral acceleration rather than the ability to allow for a high yaw rate.

Figure 3:
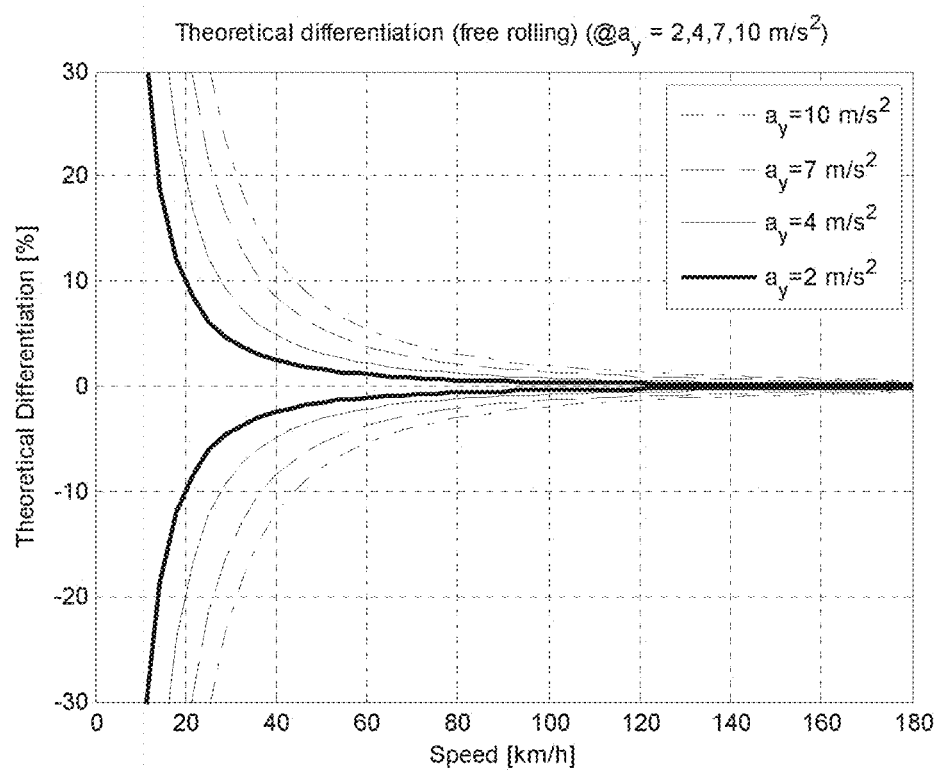
FIG. 3 is a plot of theoretical differentiation versus longitudinal velocity for cornering at different levels of lateral acceleration.

FIG. 3. Shows a plot of the theoretical differentiation versus longitudinal velocity for cornering at different levels of lateral acceleration which in essence is the inverse representation of the above mentioned fact about the minimum possible radiuses, showing how the need for the differential diminishes exponentially with increased longitudinal speed. This is a purely theoretical representation of the differentiation at zero input torque (free rolling wheels) that does not take into account any differentiated vertical deformation of the carcasses of each tire, and of course it does not take any accompanying differentiated rolling resistances into account either. In real life the differentiation would be slightly bigger than what the lines show, especially at the lines representing the higher levels of lateral acceleration.

In a high speed cornering situation with zero input torque and a locked differential there will be a certain amount of braking torque from the corner outer drive wheel and an equal amount of drive torque from the inner drive wheel, which creates an under steering (or yaw resisting) moment about the yaw axis of the vehicle. If we in the same situation apply a negative input torque, this yaw resisting moment will increase, counteracting the tendency to increase the yaw rate stemming from the longitudinal load transfer towards the front axle due to the increased deceleration (there will already be a certain amount of deceleration at zero input torque, due to rolling resistance etc.). If we instead apply a positive input torque the yaw resisting moment will decrease, counteracting the tendency to decrease the yaw rate stemming from the increased loading of the rear axle at the expense of the decreased loading of the front axle. This varying influence of the locked differential in response to varying levels and direction of input torque gets more pronounced the more lateral load transfer there is at the driven axle and its cause is an indirect effect of the differentiated normal forces pushing the drive wheels against the road surface and the consequently differentiated longitudinal stiffness of each tire. Basically one can view this whole effect as a function of how far from or how close to the previously mentioned cross-over-point the state of the vehicle is, far from the cross-over-point meaning a big influence from the locked differential, exactly at the cross-over-point no influence at all. If the lateral acceleration and the input torque are high enough (i.e. the vehicle state is above the cross-over-point) the locked differential will even start producing a yaw supporting moment about the yaw axis of the vehicle further counteracting the longitudinal load transfer based tendency to under steer.

Referring again to FIG. 3 and the open differential, which of course can't create a yaw moment, it would instead differentiate more than the line shows in response to a negative input torque and less in response to a positive input torque or even cross the zero line (cross-over-point) and thereby change differentiation direction. (Of course, also this tendency gets more pronounced the more lateral load transfer there is at the driven axle).

Figure 4:
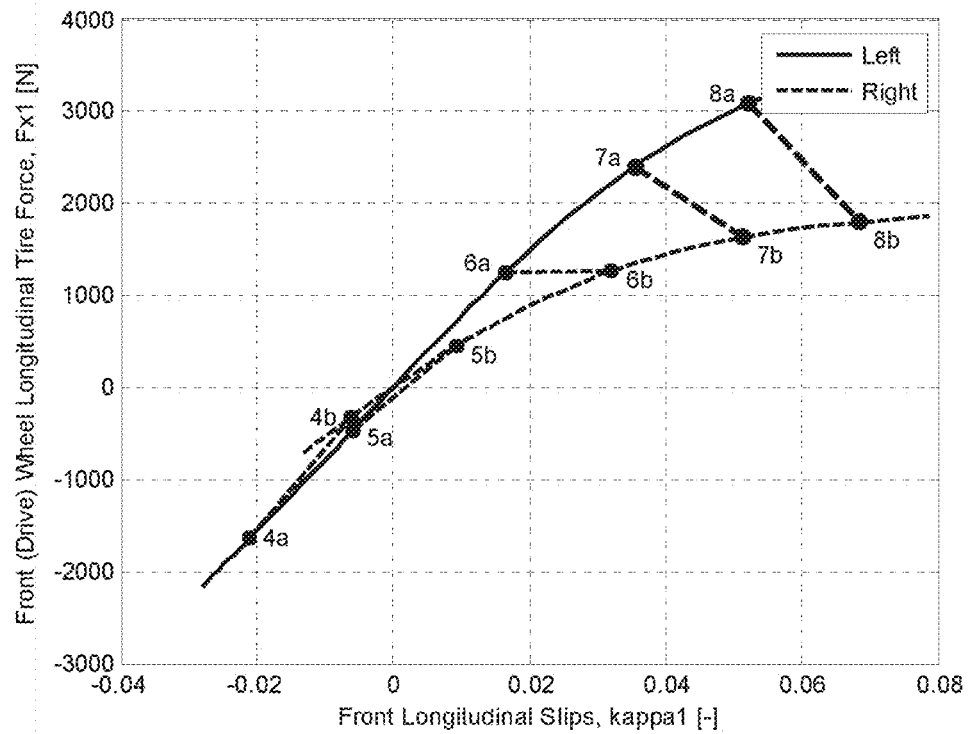
FIG. 4 is a plot showing how the influence of a locked differential, on a specific corner radius (in this case 100 m) at a specific longitudinal speed (in this case 90 km/h), depends on how near or how far from the cross-over-point the vehicle state is.

FIG. 4 illustrates how the longitudinal axle force differentiates between the corner inner and the corner outer wheel depending on the level of input torque. The two curved lines represent the longitudinal tire force versus longitudinal tire slip curve of each wheel in a corner with 100 meter radius at a lateral acceleration of 6.25 m/s$^2$. Points 4a and 4b show the amount of longitudinal tire force on each wheel when the total longitudinal tire forces are approximately 2000 N, giving a fairly strong negative yaw moment. Points 5a and 5b show the amount of longitudinal tire force when the total longitudinal tire forces are 0 N, giving a slightly weaker negative yaw moment. Points 6a and 6b show the amount of force on each wheel when the total longitudinal tire forces are approx. 2500 N and as can be seen both wheels have the same amount of longitudinal tire force meaning there will be no yaw moment. Also the difference in slip rate between each drive wheel is in this point equal to the theoretical differentiation, or more exactly, the theoretical differentiation (track width divided by corner radius) including the effect of differentiated tire deformation and rolling resistances, which means that the car here is exactly at the cross-over-point. Points 7a and 7b show the amount of longitudinal tire force on each wheel when the total longitudinal tire forces are approx. 4000 N and as can be seen there will be a certain amount of positive yaw moment due to the differentiated tire forces. Points 8a and 8b show the amount of longitudinal tire force on each wheel when the total longitudinal tire forces are approx. 5000 N, giving an even stronger yaw supporting moment. All of this show that a locked differential gives a yaw resisting or a yaw supporting moment in response to the level and direction of input torque tending to compensate for differences in yaw moment in response to longitudinal load transfer, which mean that it generally will give a more consistent handling balance than the open differential (presuming that the cornering radius is not too small which in steady state and even more so in decelerating situations might lead to too high a yaw resisting moment to develop.)

Figure 5:
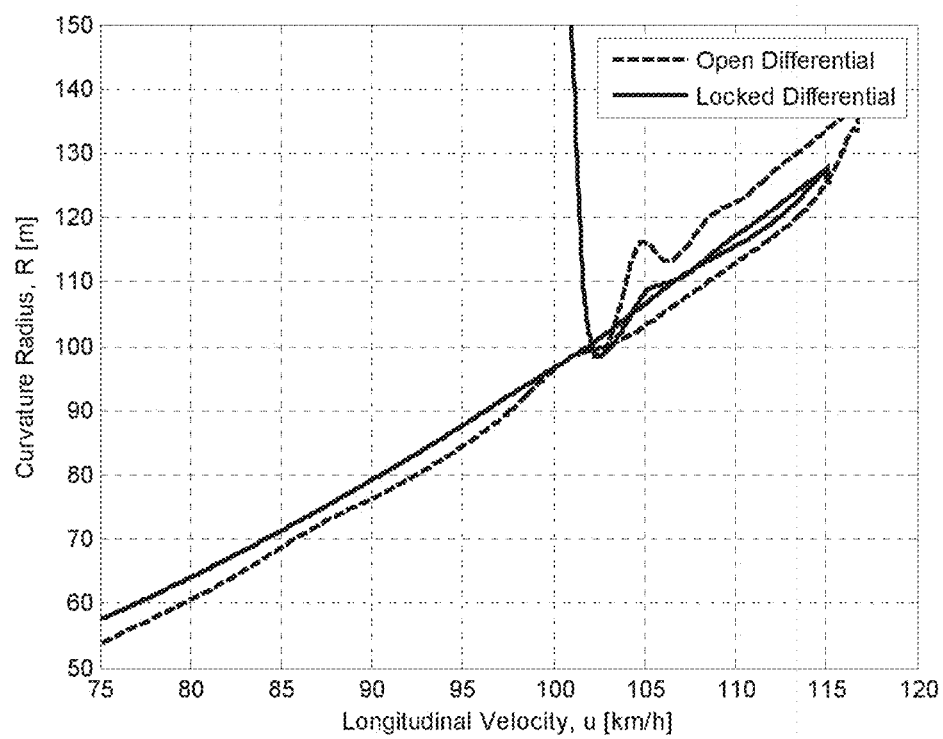
FIG. 5 is a plot of curvature radius versus longitudinal velocity for a simulated step steer (throttle on/throttle off) manoeuvre in one vehicle with an open differential and one with a locked differential.
Figure 6:
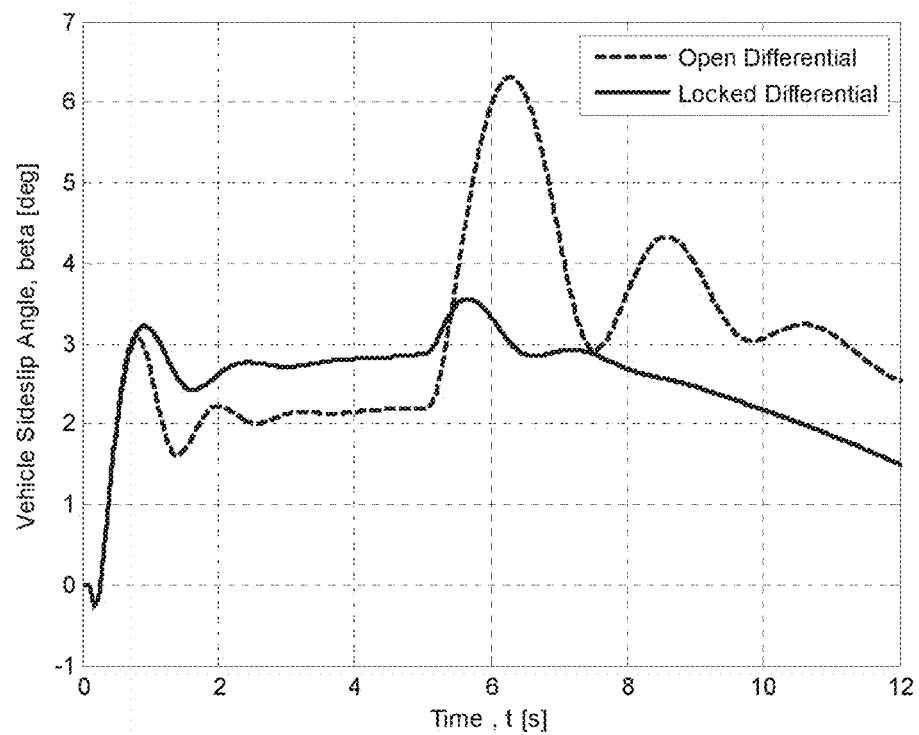
FIG. 6 is a plot of vehicle sideslip angle versus time for the same manoeuvre as in FIG. 5 in one vehicle with an open differential and one with a locked differential.
Figure 7:
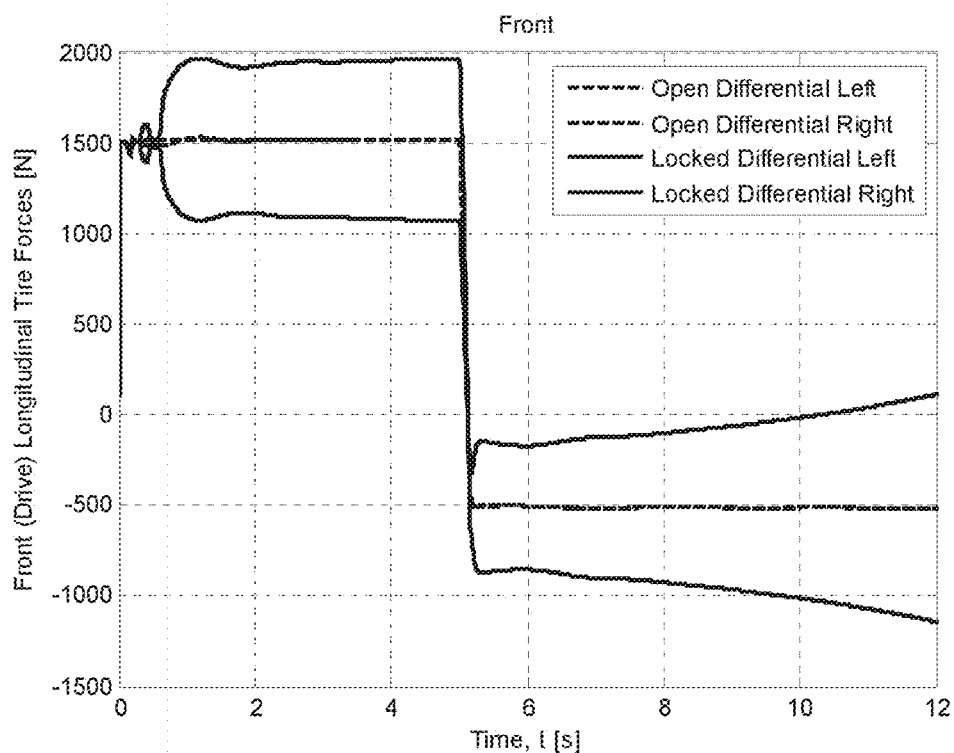
FIG. 7 is a plot of front (drive) wheel longitudinal tire forces versus time for the same manoeuvre as in FIG. 5 in one vehicle with an open differential and one with a locked differential.

FIG. 5-7 shows three different simulation results for a step steer manoeuvre in which the initial speed is 100 km/h and the initial throttle input is 80% of full throttle in third gear and the driver initially applies an 80 degree steering wheel input which is held steady throughout the manoeuvre, at five seconds the throttle is released and the car is engine braking for the rest of the manoeuvre. The same scenario is made both with an open differential and a locked differential.

FIG. 5 shows that the car with a locked differential exhibits much less difference in the curvature radius it follows, as compared to the car with an open differential, in response to the acceleration and the deceleration. It also shows that the increased under steer in deceleration, as compared to the car with the open differential is fairly small.

FIG. 6 shows the body side slip angle for the same manoeuvre and it can be seen that the vehicle with the locked differential maintains a much more consistent side slip angle before and after the throttle release (at 5 seconds). It can, by comparing the amplitude of the sideslip fluctuations in response to the throttle release, also be seen that the yaw damping is significantly increased by the locked differential. Also, the yaw fluctuation frequency, in response to the disturbance that the throttle release can be viewed as, is more consistent with the locked differential.

FIG. 7 shows the magnitude of the differentiated longitudinal tire forces that the locked differential gives. As can be seen, before the throttle release the corner outer wheel has a significantly higher longitudinal tire force than the corner inner wheel, whereas after the throttle release, the corner outer wheel generates a significantly higher braking torque than the corner inner wheel. These differentiated longitudinal tire forces are the reason that the vehicle exhibits a more consistent behaviour in FIG. 5 and FIG. 6, in spite of the effects of the obviously changing longitudinal load transfer in response to the varied throttle input.

Even though the locked differential will invoke slightly more under steer in most steady state situations, except for the most extreme cornering situations with very high lateral load transfer which indeed might mean getting above the cross-over-point in steady state cornering (especially at higher speeds when the theoretical differentiation is low due to the big corner radiuses) meaning that the locked differential would start invoking a slight yaw supporting moment, the extra stability in most steady state situations and even more so in off throttle or braking situations also mean that we can afford ourselves to tune the baseline handling balance with a smaller under steer gradient in the first place, making for a more consistent handling balance irrespective of the lateral accelerations as well.

Referring again to FIG. 5. the steepness of the lines as the cornering radius increases with increased speed is a measure of the under steer gradient which means that tuning the car for less under steer would mean that the general slope would be slightly less steep and that the cornering radius would therefore be tighter at high speeds or that a smaller steering input would be required for the same cornering radius at high speeds. An altered handling balance for less under steer would also directly lead to an increased handling limit speed meaning a higher cornering performance.

So instead of having a closed loop "active" system (i.e. feed-back control) that evaluates sensor data and makes more or less continuous adjustments to the clutch pressure of an eLSD in response to a reference model to potentially give a yaw resisting moment if and when an over steer tendency is detected, the proposed method of the present invention is one of letting predefined criterions, or in other words feed-forward control, trigger a switching into a "pre-emptive" stability-mode (which in effect is a locked mode) meaning that we will get a system that will, on its own accord, mechanically adjust the differentiated longitudinal tire forces of the drive wheels directly in response to the amount of yaw rate, the input torque and the longitudinal stiffness of each tire of the drive wheels, which in itself is the result of (aside from the tire design itself) the normal force of each tire and the mu value etc. All of this will happen with no other delays than the ones that the flexibility of the drive shafts, the stiffness of the differential including the locking device and the flexibility of the tires themselves will give rise to.

The stability-mode is meant to be used for example for highway driving. When we drive normally along a highway the road itself have minimum corner radiuses big enough for the driver not to be able to subjectively notice the difference of having an open or a locked differential. However, if there is an obstacle ahead forcing the driver to make an avoidance manoeuvre, the driver might want to get the vehicle to turn at the smallest possible radius to avoid the obstacle in front of the vehicle. Assuming the driver makes as tight an avoidance manoeuvre the vehicle can handle, in this case a locked differential would mean that the yaw rate would be slightly lower than with an open differential but as already mentioned, the limiting factor of making the vehicle turn at the tightest possible radius, at higher speeds, is more about the ability to build lateral acceleration quickly than to get a high yaw rate (which actually may become unnecessarily high in a situation like this).

To tune the vehicle for less under steer on the other hand will probably give it quicker initial turn in and lateral acceleration build up, compensating for or possibly even more than compensating for the slightly lower yaw rate, meaning that the vehicle potentially might get an even higher lateral acceleration and follow a smaller radius despite of the slightly lower yaw rate. Anyway, the roads as they are can be thought of as narrow corridors which mean that in order for the driver to stay on the road after hopefully having been able to avoid the obstacle he now has to turn in the other direction to steer into the other lane.

The first thing to notice in this situation is that because of the mass moment of inertia of the vehicle it will want to continue its present yawing motion which means that there will be a delay of the vehicle yaw rate to follow the drivers intention as indicated by the new steering input. However, once the yaw rate in the first direction begins to decline the yaw acceleration will be considerably stronger than in the first input because of the fact that the rear and the front tires now will develop fairly strong lateral forces in opposite directions for a short period of time, this means that the yaw rate of the second steer input almost without exception will become unnecessarily high and also that the mass inertia of the vehicle therefore will try to force the yawing motion to continue for much longer than needed. This means that the driver will have to counter steer heavily to stop the excessive rotation of the vehicle.

It is important to realise that, for transient steering manoeuvres, the cornering radius that the vehicle is following is not necessarily that tightly tied to the actual yaw rate of the vehicle. It is also important to realise that what the driver really wants in a lane change manoeuvre is a quick sideways displacement of the vehicle rather than a high yaw rate.

The previously mentioned flexibility of the drive shafts etcetera, when cornering with a locked differential, mean that there will be a wind up in the system which will act as storage of energy that will be released again as soon as the driver changes the steering lock to the other direction. This will give a short term torque-vectoring effect, meaning that there will actually be a higher torque at the drive wheel with the highest rotational speed for a short period of time just before and slightly after the yaw rate changes direction. All of this means that the proposed method of controlling the differential will both limit the maximum amount of yaw rate but it will also greatly change the yaw response by decreasing the delay that normally exists between subsequent steering inputs as for example in evasive manoeuvres. This makes the vehicle much more stable and it also improves the steering precision in consecutive steering manoeuvres. All of which will make the vehicle much easier to control in critical situations, even by less experienced drivers that generally have difficulties making needed counter steer corrections soon and precise enough to avoid losing control.

Figure 8:
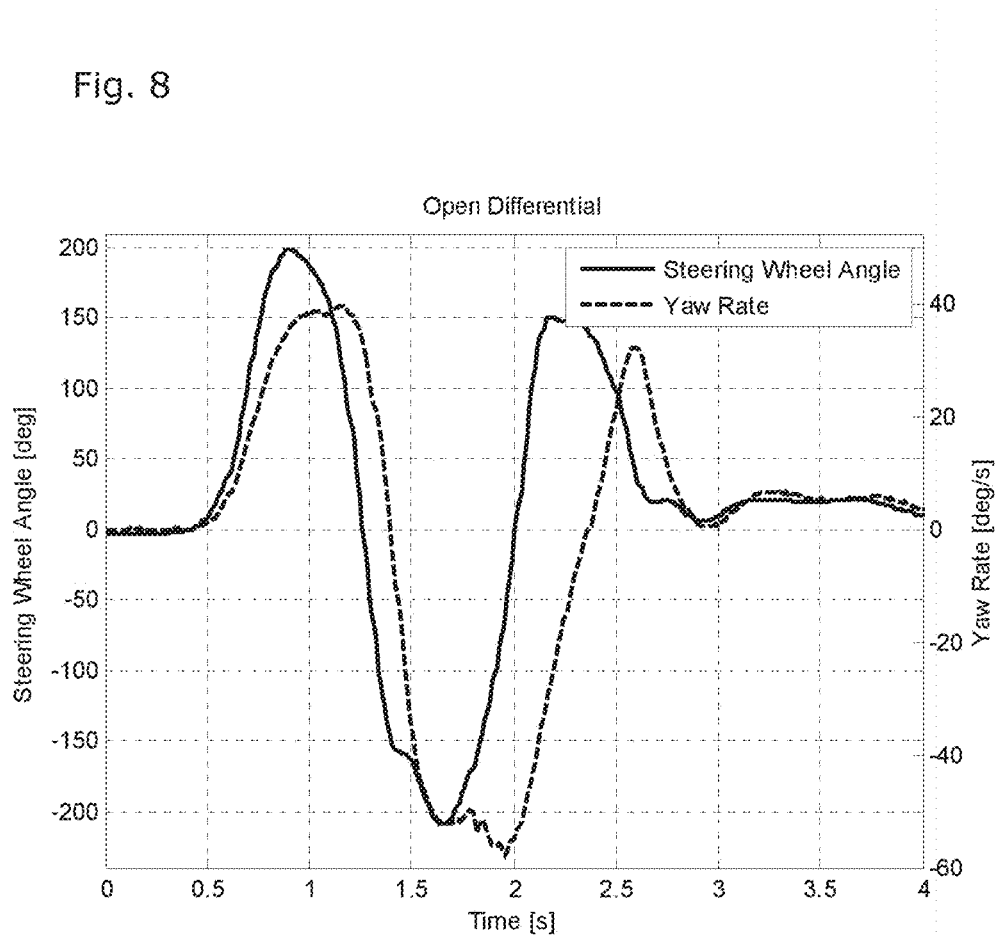
FIG. 8 is a plot of steering wheel input and vehicle yaw rate for a single lane change manoeuvre in a vehicle with an open differential.
Figure 9:
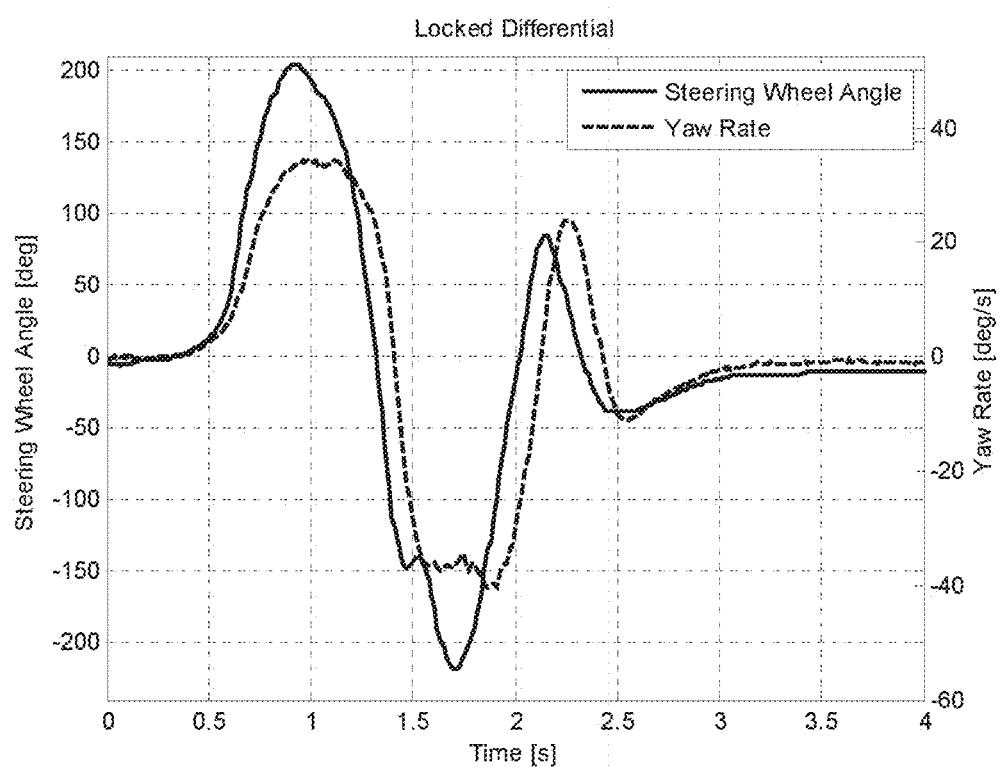
FIG. 9 is a plot of steering wheel input and vehicle yaw rate for a single lane change manoeuvre in a vehicle with a locked differential.

FIGS. 8-14 shows different aspects of testing results from a single lane change manoeuvre which is carried out with an initial speed of 68 km/h and with zero input torque (clutch disengaged) during the manoeuvre. FIG. 8 shows steering wheel angle (solid line) and yaw rate (dashed line) with an open differential and FIG. 9 shows the same signals with a locked differential. As can be seen, both the maximum amount of yaw rate and the yaw rate delay are significantly reduced by the locked differential.

Figure 10:
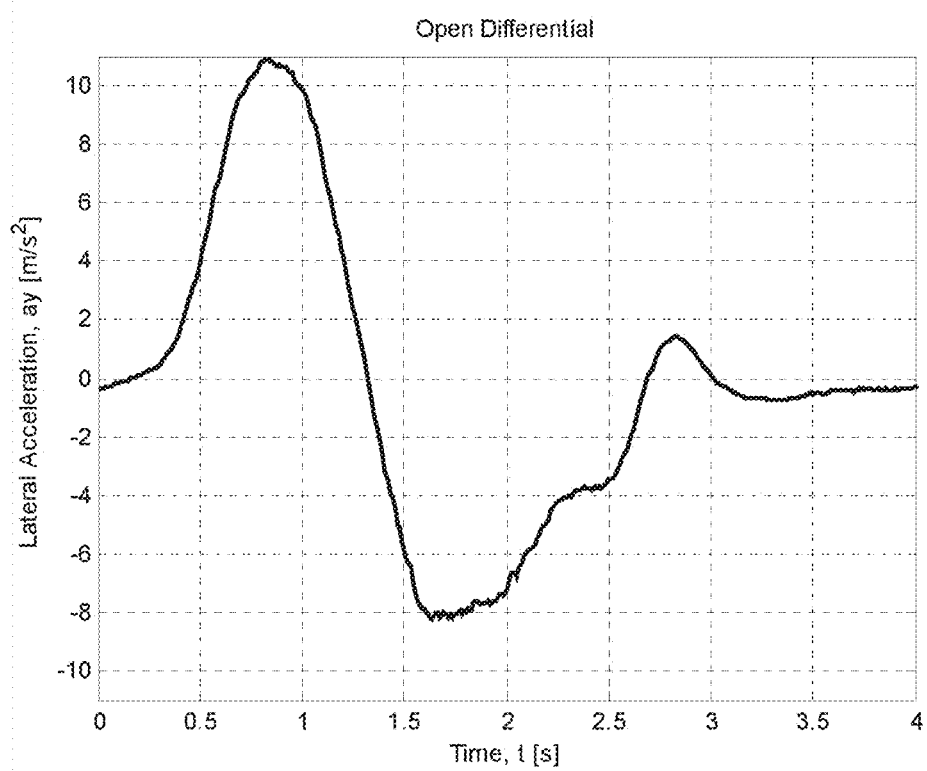
FIG. 10 is a plot of lateral acceleration for a single lane change manoeuvre in a vehicle with an open differential.
Figure 11:
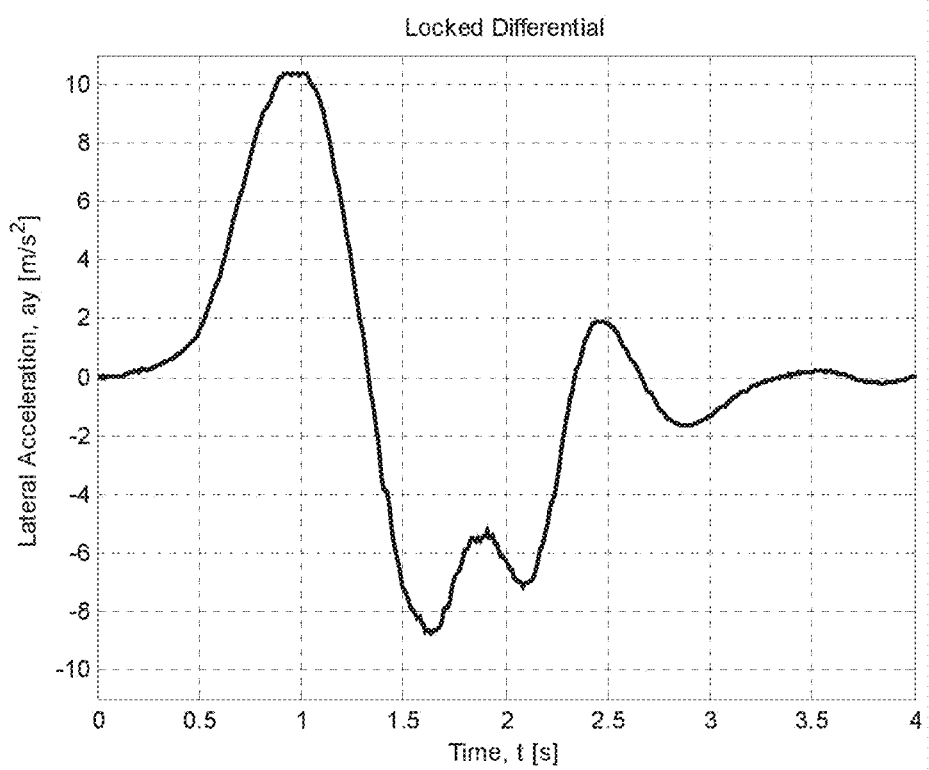
FIG. 11 is a plot of lateral acceleration for a single lane change manoeuvre in a vehicle with a locked differential.

FIG. 10 shows the lateral acceleration with an open differential and FIG. 11 shows the lateral acceleration with a locked differential, as can be seen there is very little difference between the amounts of lateral acceleration achieved.

Figure 14:
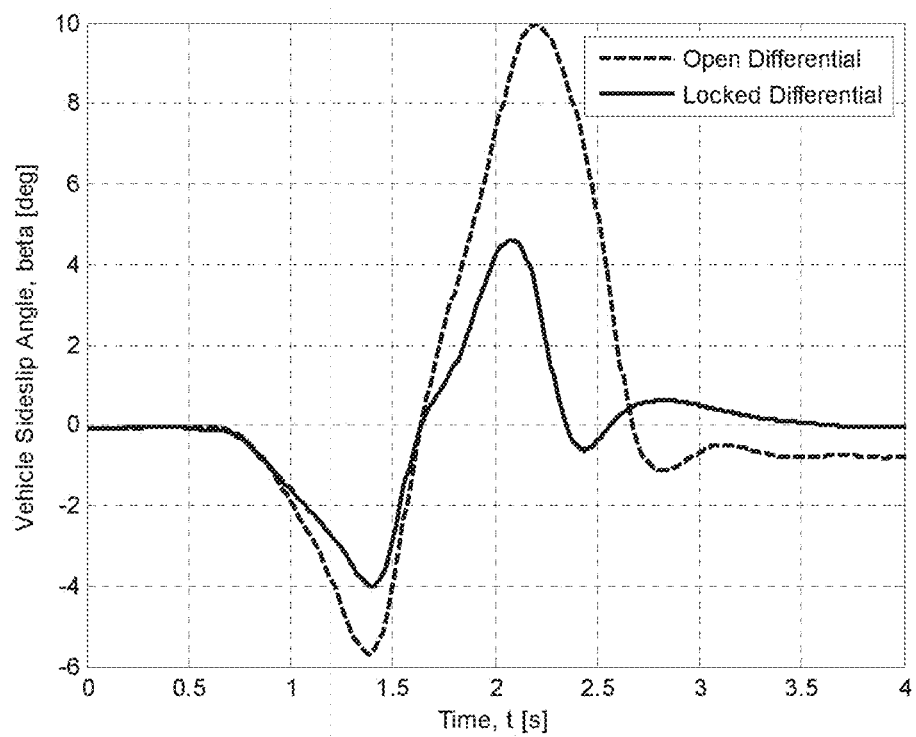
FIG. 14 is a plot of vehicle side slip angle for a single lane change manoeuvre in one vehicle with an open differential and one with a locked differential.
Figure 15:
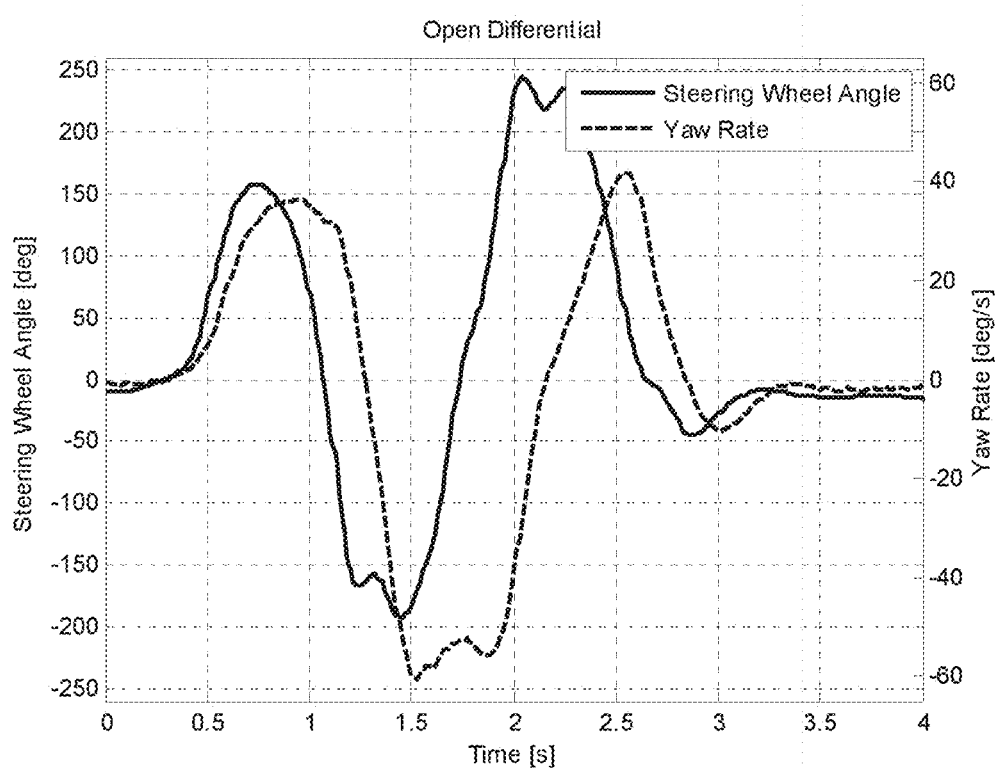
FIG. 15 is a plot of steering wheel input and vehicle yaw rate for a single lane change manoeuvre in a vehicle with an open differential, the initial speed being 90 km/h.
Figure 16:
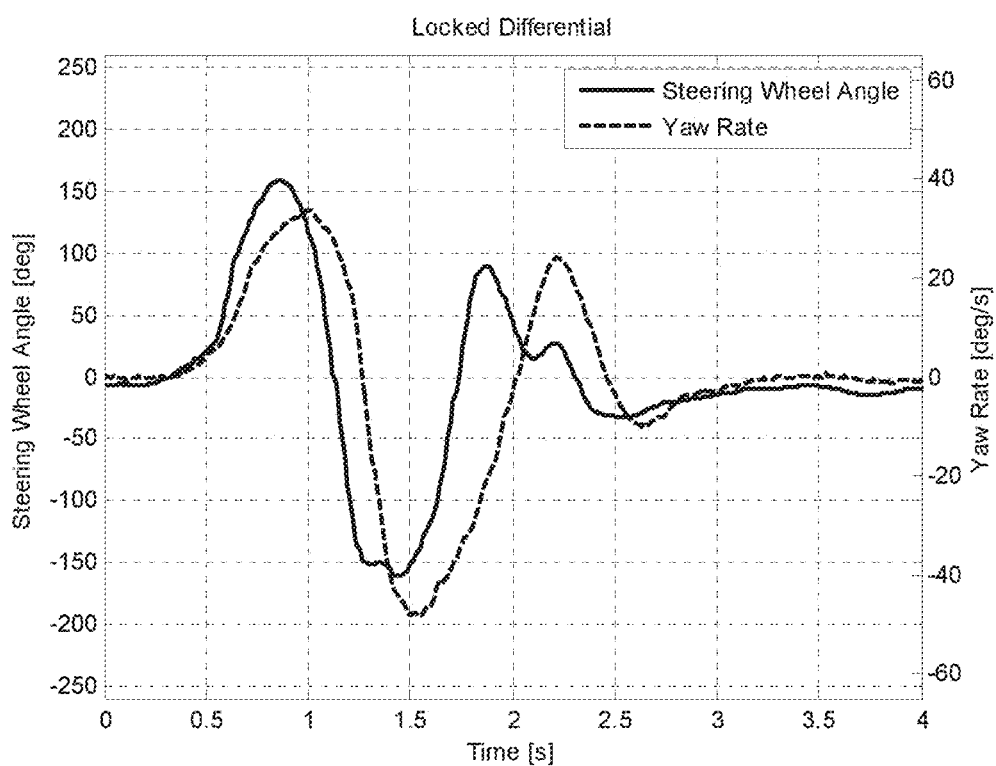
FIG. 16 is a plot of steering wheel input and vehicle yaw rate for a single lane change manoeuvre in a vehicle with a locked differential, the initial speed being 90 km/h.
Figure 17:
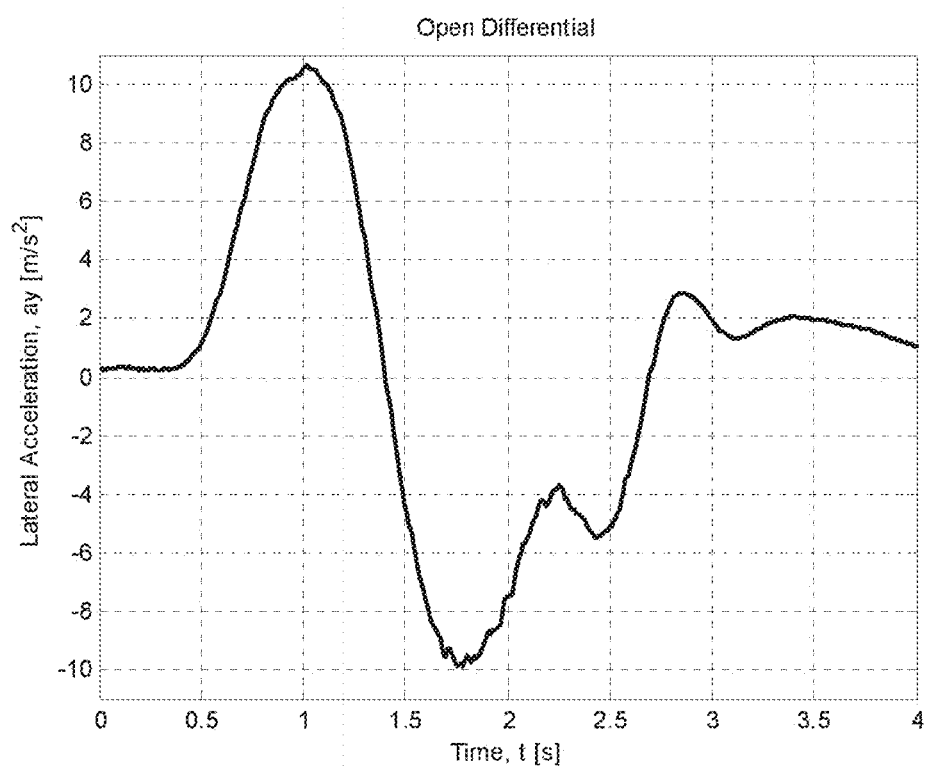
FIG. 17 is a plot of lateral acceleration for a single lane change manoeuvre in a vehicle with an open differential, the initial speed being 90 km/h.
Figure 18:
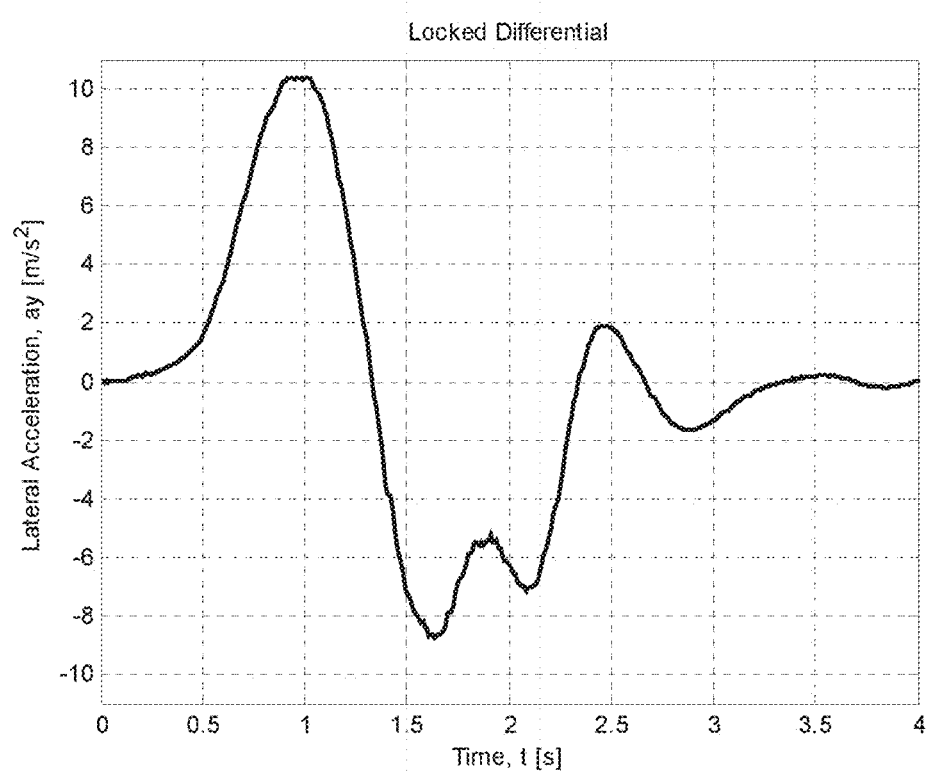
FIG. 18 is a plot of lateral acceleration for a single lane change manoeuvre in a vehicle with a locked differential, the initial speed being 90 km/h.

FIG. 14 shows the body sideslip angle, the dashed line is for an open differential and the solid line is for a locked differential, as can be seen the sideslip angle is virtually halved in the case of the locked differential. This is due to the differentiated longitudinal tire forces, of in this case the front drive wheels, adding a negative yaw moment helping the saturated rear wheel tires by compensating for their inadequate lateral force capacity, greatly improving the stability of the vehicle.

The stability-mode will in the case of a "positively" locking differential such as the Direction Sensitive Locking Differential according to WO 2006/041384 be fully locked but in the case of using the proposed method as part of a control strategy for an eLSD the clamping pressure could conceivably be set at a value that allows the clutch to start slipping at a certain maximum torque difference between each drive shaft. On this note however, it could be relevant to point out the fact that, as previously mentioned, differential-based stability control is reactive in its nature and that it also, contrary to brake-based stability control, is dependent on the traction capacity of both the corner outer and the corner inner tire to generate a yaw resisting moment. This fact normally, in high lateral acceleration manoeuvres, means, due to the lateral load transfer, that the maximum amount of yaw resisting moment that can be generated is limited by the ability of the corner inner tire to find grip against the road surface. This also means that this maximum amount of yaw resisting moment which also equates to a certain amount of wind up, in some cases due to a really lightly loaded inner wheel or e.g. due to bumps in the road surface, might "leak" out of the system, meaning unwinding through the poor tire friction of the lightly loaded inner wheel.

Figure 12:
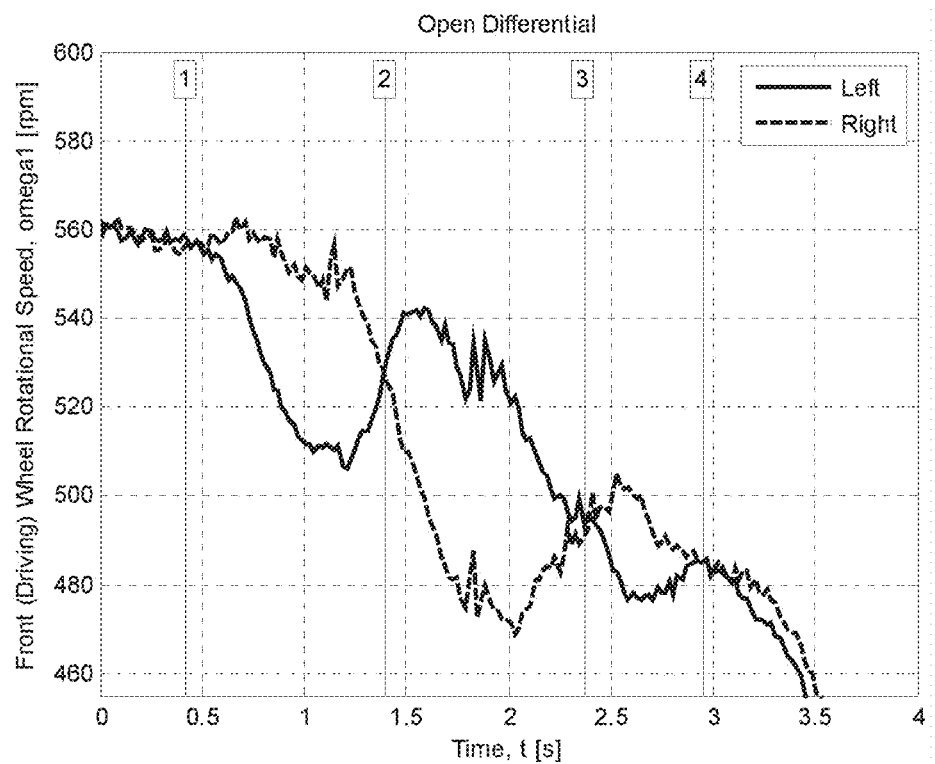
FIG. 12 is a plot of front (driving) wheel rotational speed for a single lane change manoeuvre in a vehicle with an open differential.
Figure 13:
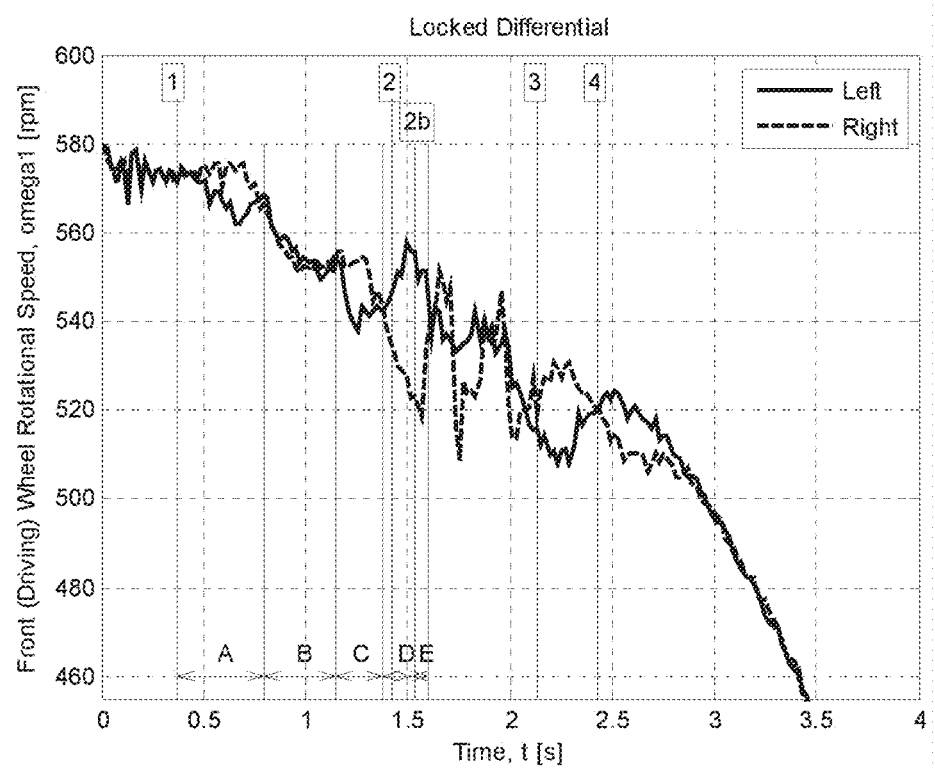
FIG. 13 is a plot of front (driving) wheel rotational speed for a single lane change manoeuvre in a vehicle with a locked differential.

Referring now to FIG. 12 and FIG. 13 which show the (front) drive wheel speeds during a single lane change manoeuvre, the solid lines are for the left wheels and the dashed lines are for the right wheels. FIG. 12 shows the wheel speeds for an open differential and it can be seen that the differentiation speed is in the region of forty rpm (or ⅔ rps) in the first direction and that it is slightly higher in the second direction where also the yaw rate is higher, as can be seen by comparing the yaw rate from the same manoeuvre in FIG. 8. By the same comparison it can also be seen that the differentiation is changing direction at the same instant that the yaw rate changes sign (crosses the zero line as indicated by the thin lines 2, 3 and 4 corresponding to the yaw rate zero points of FIG. 8 line 1 corresponds to the start of the "first" yawing motion).

FIG. 13 shows the wheel speeds for a locked differential and here we can see that the wheel differentiation speed is seriously hampered. However, it can also be seen that there is some differentiation (wind-up) in the first part of the first steering direction (section A) but virtually no differentiation at all in Section B (perhaps even a minute amount of unwinding). The latter section corresponds to the highest amount of lateral acceleration and hence a very lightly loaded inner wheel, whereas in section C the differentiation starts again (more wind up). After that it can be seen by line 2 that there is a yaw rate direction change and also that the wheel differentiation speed gets considerably higher. The main reason for this is the fact that roughly ⅔ of that differentiation "area" (section D) consists of unwinding or release of energy stored from the first steering direction and consequently the torque reversal within the differential itself will happen at line 2b, from which the wind-up will start again, now in the other direction. The amount of wind up, as measured between both wheels, is roughly 12 degrees in section A and C respectively, which means that there is a bit more than 20 degrees of unwinding in section D. (Just as a comparison to the open differential, it differentiates roughly 130 degrees or slightly more than ⅓ of a full revolution in the first steering direction). It is also relevant to point out that the actual change of differentiation direction (as measured at the wheels) happens slightly before the yaw rate changes sign (direction) and that the unwinding during section D also means that there will be a higher drive torque at the wheel with the higher rotational speed (in this case the left wheel) helping the vehicle to more quickly follow the intention of the driver, as indicated by the steering wheel input. In section E it can be seen that there is a wind up in the new direction but then there are several unwinding and wind up sequences one after the other, this is typically because of the fact that the yaw rate is higher at this point, meaning that the angular momentum of the car is higher which leaves the inside tire to struggle for grip. The way in which the "weaker" inside tire limits the maximum amount of negative yaw moment actually means that a fully locked differential can be beneficial fairly low down in the speed range if and when the driver attempts really aggressive steering manoeuvres.

As already mentioned the greatly increased high speed stability, from a locked differential, means that the base car handling balance can be tuned for less under steer. This is based on the premise that the tuning of the handling balance of a vehicle is to some extent a compromise with respect to longitudinal speed in a way that for low speed, agility should be favoured and for higher speed stability should be favoured. I.e. if you were to design a car made only for low speed driving, it would probably end up with less under steer built into it than a car solely designed for high speed driving. This assumption also means that any active system, for example a four wheel steer system, could be used to improve low speed agility by steering the rear wheels slightly in the opposite direction to the front wheels at lower speeds to improve its responsiveness and increase its yaw acceleration to make it better in quick steering transitions and through tight corners which occasionally are encountered at low speed driving. The same system could conceivably not steer the rear wheels at all when cornering at some medium speed interval and finally steer the rear wheels slightly in the same direction as the front wheels at higher speeds to decrease the yaw acceleration and the amount of body sideslip angle needed to develop a certain amount of rear tire side force, to thereby make the car more stable and calm at high speeds when lack of yaw damping and stability is more prone to be a problem. In this way the handling balance can become less of a compromise with respect to driving speed. In a similar way, the proposed method of controlling a differential for a vehicle means that the speed range of the vehicle is divided into three different speed intervals, i.e. low speed, medium speed and high speed. In the low speed interval the differential will be open. In the case of the Direction Sensitive Locking Differential (DSLD) the default control mode will be the open mode but as soon as for example a certain amount of yaw rate, or some other relevant signal, indicates a cornering situation the DSLD will be switched into the appropriate cornering performance mode (Cornering Performance Left or Cornering Performance Right) meaning it will be open for differentiation in the normal direction only i.e. the corner outer drive wheel is allowed to over speed the inner wheel but not the other way around). The same is true also for the medium speed range. All of this however, is outside of the scope of the present invention but part of WO 2006/041384 and described herein only as a reference and to point out that if the present invention is implemented using a DSLD these other aspect of controlling a differential for example to improve the traction capabilities of a vehicle is slightly different than the approach utilised to improve these same properties in for example an eLSD. The present invention is only concerned with steps taken to improve the vehicle medium to high speed stability as well as altering the yaw response of the vehicle in consecutive steering manoeuvres.

In the low and medium speed intervals the open differential will be the default mode of the controller, meaning that the vehicle steering responses will be agile, especially if it is tuned to have a fairly neutral steady state handling balance. It might perceivably also for example have less rear axle toe-in to further improve agility and potentially reduce rolling drag. It might also have a less complicated rear axle, for example a twist beam axle instead of a multi-link axle to save cost and improve packaging, presuming that the more compromised kinematics and compliance characteristics of the simpler axle may not be perceived as that much of a disadvantage for as long as the driving speed is low enough.

In accordance with the present invention there will be an upper speed threshold (referred to as $V_H$) above which the default mode of the differential will be its locked mode. Said threshold could of course to some extent be varied depending on the type of vehicle it is used in but said threshold could also be variable for example in response to different driver selectable settings e.g. normal mode, snow mode sport mode etc. It could also be variable in response to a vehicle supervisory electronic control influenced for example by driving style road condition estimations etc. Anyway, this means that the only differentiation taking place at the wheels will be the one determined by the torsion stiffness of the drive shafts etc. This will most likely more than compensate for the reduced stability due to the mentioned retuned base vehicle handling balance etc. A further benefit of the locked differential is that any other disturbance, than a sudden steering input, that starts a yawing motion will have a tendency to self-correct and it will do so with the minimum hesitation due to the reactive nature of the locked differential induced yaw-resistance. The mentioned disturbance can for example consist of a light collision impact, which may or may not start a yawing motion of the vehicle depending on where it hits but if it does it will tend to self-correct. If it is a front wheel drive car a sudden puncture of a rear tire or other failure of the rear axle in a high speed cornering situation would also benefit stability-wise by the locked differential.

As stated above, the upper speed threshold $V_H$ can be varied depending on multiple variables but the general idea is that it should be chosen in a way that the locked differential will give generally positive effects even in steady state or semi steady state cornering situations, positive in the form of no real effect at all at larger cornering radiuses and a more linear behaviour irrespective of if the vehicle is accelerating or decelerating in tighter bends (higher lateral acceleration), and not only the more obviously positive effect of more stability in transient manoeuvres. For clarity let's look at an example, if we imagine a car driving at 100 km/h and the driver negotiates a turn with a radius of 150 meters then the steady state lateral acceleration will be 5.14 m/s$^2$, if the car has a 1.5 meter track width at the driven axle there will be a theoretical (zero input torque) differentiation of 1 (track width divided by the cornering radius), in steady state the differentiation would be slightly lower still depending on the equally divided input torque and the lateral load transfer generating a slightly higher slip rate at the corner inner wheel. In this situation it will be virtually impossible for the driver to subjectively tell if the differential is locked or open. If the cornering radius would be 90 meters instead, the lateral acceleration would be 8.67 m/s$^2$ and the car might very well be exactly at the "cross-over-point" in steady state, meaning that an open differential wouldn't differentiate at all in spite of the bigger theoretical differentiation (1.7% due to smaller curve radius) which of course also means that there wouldn't be any effect of having the differential locked instead of open. On the other hand, if the driver would release the throttle pedal and decelerate or instead squeeze it harder to accelerate, the locked differential would tend to compensate for the load transfer based change in handling balance by advantageously differentiate the longitudinal tire forces and hence make the handling balance much less varied in response to longitudinal acceleration and load transfer and hence give generally positive effects in steady state or semi steady state cornering situations. Another way to put it would be to say that the threshold speed $V_H$ is chosen at a longitudinal speed above which the differential in fact is not needed.

In accordance with the present invention there will also be a lower speed threshold (referred to as $V_L$), which is at a lower longitudinal vehicle speed than the above mentioned upper speed threshold. Said lower speed threshold could, in a similar way as the upper speed threshold, also be varied according to different criteria (driver selectable or electronically varied). This means that there will be a medium speed interval between a lower speed threshold and an upper ditto. Said medium speed interval, is characterised by the facts that the default mode of the differential will be its open mode (or in the case of the DSLD sometimes in cornering performance mode). However, it can, depending on feed-forward criteria, other than vehicle speed, at any point switch over to the locked mode. Said criterions can be based on for example steering wheel input speed and amplitude, possibly influenced by the vehicle longitudinal accelerations or brake pressure etc. The reason for the need of said medium speed interval is the fact that below the upper speed threshold there would be a risk of generating unfavourably high yaw resisting moments and hence an unwanted degree of under steer if the differential were to be locked, especially in medium lateral acceleration manoeuvres (due to fairly tight cornering radiuses and not very weakened longitudinal stiffness of the corner inner tire). Or in other words there is a potential of getting unwanted amounts of under steer in steady state or semi steady state cornering situations in this medium speed interval and therefore the differential should normally be open. On the other hand there are potentially big gains of locking the differential if the driver for example makes a very sudden and big steering input, as for example the one shown in FIG. 12, in which the initial speed at the time of the steering input is less than 68 km/h, which will generally be well below said upper speed threshold.

This all means that there will be situations in which it will be advantageous to switch to the locked mode based solely on feed-forward criterions (other than the vehicle speed).

Figure 19:
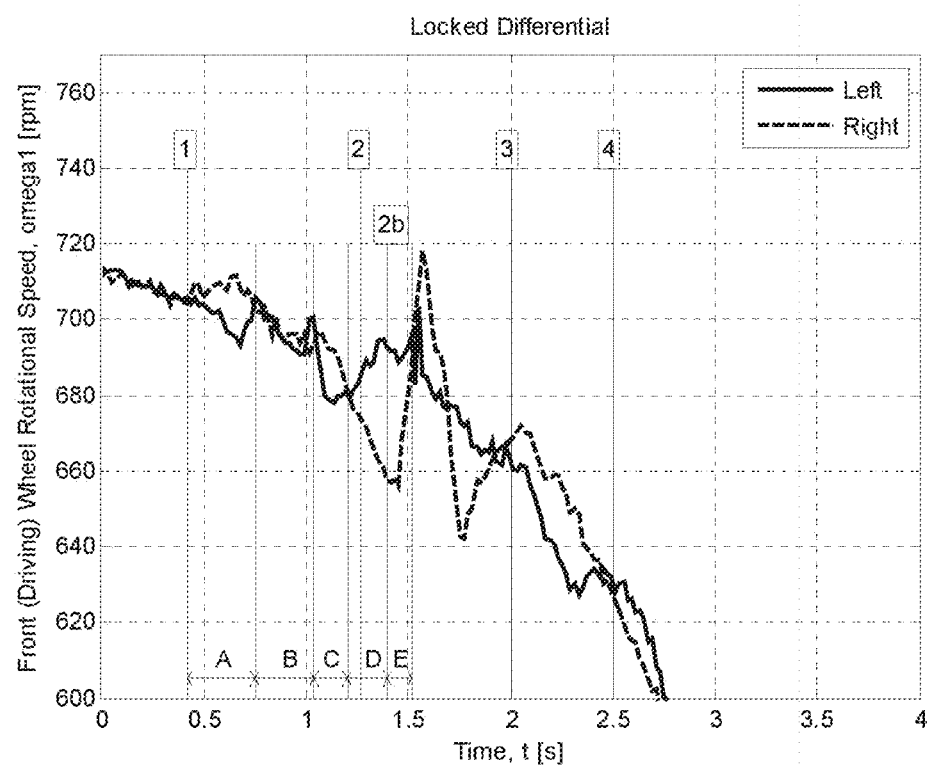
FIG. 19 is a plot front (driving) wheel rotational speed for a single lane change manoeuvre in a vehicle with a locked differential, the initial speed being 90 km/h.
Figure 20:
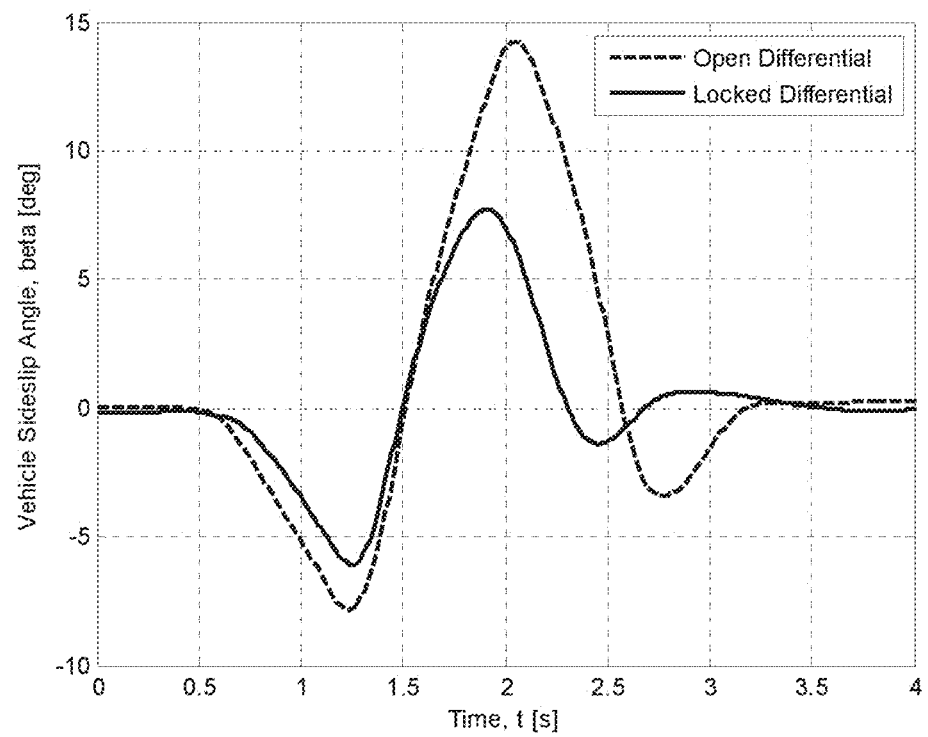
FIG. 20 is a plot of Vehicle side slip angle for a single lane change manoeuvre in one vehicle with an open differential and one with a locked differential, the initial speed being 90 km/h.

For comparison with a manoeuvre made at a speed more likely to be above the upper speed threshold, i.e. a speed high enough to have triggered the fully pre-emptive stability mode, (based on longitudinal speed alone) the FIGS. 15-20 show different aspects of a single lane change (similar to the ones shown in FIGS. 8-14) but in this case made at an initial speed of 90 km/h. FIG. 19 also shows the same help lines and sections as described in reference to FIG. 13.

Apart from the exception of differentiation caused by excessive input torque from a power source, (i.e. wheel spin) the maximum differentiation imposed by the "travelling speed" with respect to the road surface will never exceed roughly half a revolution per second. The differentiation speed of the locking device as such, acting between the input shaft (differential cage) and one of the output shafts is furthermore only half of that. This fairly low differentiation speed means that it will be possible to lock the differential at any point during any "cornering" manoeuvre. Referring again to FIG. 13 this means that probably a fairly similar result could be had by locking the differential sometime during the first steering input (between reference line 1 and 2), possibly making the initial turn in slightly sharper, depending on how late the locking is done. This way of controlling the differential would conceivably be advantageous at a lower spectrum of a medium speed interval. It is of course also possible to have the differential open during the whole initial steering input and lock it during the second steering input.

Both the speed thresholds $V_H$ and $V_L$ are chosen within a longitudinal vehicle speed interval where yaw rated gain and lateral acceleration gain is rather high but where the measure of yaw damping is severely limited. Because of this it will be beneficial to use differentiated longitudinal tire forces to increase the stability of a vehicle in severe transient steering manoeuvres.

The previously proposed feed forward values for triggering the locking of the differential when in the medium speed interval are merely tentative and may well be much more elaborate, for example the signal values can correspond to values in a look up table corresponding to multiple speed thresholds within the total medium speed interval $V_L$-$V_H$, said look up table may also take into account many more sensor signals than just the steering input.

Referring to the above, it could also be relevant to mention potential future sensors or sensor fusion information, for example radar, cameras, GPS etcetera, that could give the stability-control system better insight into the near future, making it even better prepared to choose the most appropriate working mode in all conceivable situations.

The basic thought of the pre-emptive switching to the stability-mode if and when the vehicle stability can be suspected to be threatened based on the feed-forward sensor signals is firstly to avoid potentially unnecessary delays of the yaw resisting moment build-up, secondly to speed up the vehicle reactions in the earliest part of a new "yawing direction" and thirdly to simplify the required control system. In this way the vehicle will, in the stability-mode, become significantly more stable, react quicker to steering reversal requests from the driver and in the open mode it will retain its (retuned) base handling setting which means it will be more agile. All this together mean that the vehicle will have two different handling characteristics which can be selected for different driving scenarios and hence the handling balance will be far less of a compromise. Also, this can be achieved at a low cost and using simple control.

It is to be understood that the present invention is not limited to the embodiments described above and illustrated in the drawings; rather, the skilled person will recognize that many changes and modifications may be made within the scope of the appended claims.

The invention claimed is:

1. A method for increasing medium to high speed stability and for controlling a transient yaw response of a road vehicle as a result of steering input, said vehicle being equipped with a front axle, a rear axle, a controllable differential and a control unit arranged for locking and unlocking said differential, said method comprising:

selectively locking or unlocking said differential depending on an operation of said vehicle, including at least the sub-steps of:
measuring at least the longitudinal vehicle speed;
comparing the measured vehicle speed with a predetermined first reference speed; and
locking said differential if said measured vehicle speed exceeds said first reference speed;
comparing said measured vehicle speed with a predetermined further reference speed if the differential is in a locked condition, said further reference speed being lower than said first reference speed; and
unlocking said differential if the measured vehicle speed is lower than said further reference speed.

2. The method according to claim 1, further comprising:
setting said first reference speed to a value within the interval 80-110 km/h.

3. A method for increasing medium to high speed stability and for controlling a transient yaw response of a road vehicle as a result of steering input, said vehicle being equipped with a front axle, a rear axle, a controllable differential and a control unit arranged for locking and unlocking said differential, said method comprising:

selectively locking or unlocking said differential depending on a steering operation of said vehicle, including at least the sub-steps of
measuring at least the longitudinal vehicle speed,
comparing the measured vehicle speed with a predetermined first reference speed, and
locking said differential if said measured vehicle speed exceeds said first reference speed;
and in the event that the measured vehicle speed does not exceed said first reference speed,
comparing the measured vehicle speed with a predetermined second reference speed,
measuring a front wheel steer angle of the vehicle,
comparing the front wheel steer angle with a predetermined reference value of the front wheel steer angle value,
measuring a front wheel steer angle rate of the vehicle,
comparing the front wheel steer angle rate with a predetermined reference value of the front wheel steer angle rate value, and
locking said differential if the measured vehicle speed exceeds said second reference speed and also any one of the following conditions:
i) the measured front wheel steer angle exceeds said predetermined reference value of the front wheel steer angle, or
ii) the measured front wheel steer angle rate exceeds said predetermined reference value of the front wheel steer angle rate, or iii) the measured front wheel steer angle exceeds said predetermined reference value of the front wheel steer angle and the measured front wheel steer angle rate exceeds said predetermined reference value of the front wheel steer angle rate.

4. The method according to claim 3, further comprising: setting said second reference speed to a value within the interval 60-80 km/h.

5. The method according to claim 3, further comprising: setting said reference value of the front wheel steer angle rate to a value within the interval 20-50 degrees/s.

6. The method according to claim 3, further comprising: measuring the longitudinal vehicle speed and comparing said speed with a predetermined further reference value if the differential is in a locked condition;
unlocking said differential if the measured vehicle speed is lower than said further reference value and if a front wheel steer angle is higher than a reference front steer angle.

7. The method according to claim 6, further comprising: setting said further reference value to a value within the interval 55-80 km/h.

8. A system for increasing medium to high speed stability and controlling a transient yaw response of a road vehicle as a result of steering input, where said vehicle is equipped with a front axle, a rear axle, a controllable differential and actuation means arranged for locking and unlocking said differential, the system comprising:
a control unit configured to control said actuation means for selectively locking or unlocking said differential depending on a steering operation of said vehicle,
wherein the control unit is configured to measure at least the longitudinal vehicle speed to compare the measured vehicle speed with a predetermined first reference speed, and to lock said differential if said measured vehicle speed exceeds said first reference speed,
wherein the control unit is also configured to, in the event that the measured vehicle speed does not exceed said first reference speed, compare the measured vehicle speed with a predetermined second reference speed,
wherein the control unit is further configured to measure a front wheel steer angle rate of the vehicle, compare the front wheel steer angle rate with a predetermined reference value, and measure a front wheel steer angle of the vehicle and comparing the front wheel steer angle with a predetermined reference value, and
wherein the control unit is yet further configured to lock said differential if the measured vehicle speed exceeds said second reference speed and also any one of the following conditions:
i) the measured front wheel steer angle exceeds said predetermined reference value of the front wheel steer angle, or
ii) the measured front wheel steer angle rate exceeds said predetermined reference value of the front wheel steer angle rate, or
iii) the measured front wheel steer angle exceeds said predetermined reference value of the front wheel steer angle and the measured front wheel steer angle rate exceeds said predetermined reference value of the front wheel steer angle rate.

9. A vehicle comprising a system according to claim 8.

10. A non-transitory computer readable medium having recorded thereon a computer program comprising program code that, upon execution by a processor of a computer, causes the computer to perform the steps of claim 1.

11. A control unit for controlling the stability and yaw response of a vehicle, the control unit being configured to perform the steps of the method according to claim 1.

* * * * *